(12) United States Patent
Chin et al.

(10) Patent No.: US 12,461,925 B2
(45) Date of Patent: Nov. 4, 2025

(54) IDENTIFYING RELEVANT INFORMATION WITHIN A DOCUMENT HOSTING SYSTEM

(71) Applicant: Dropbox, Inc., San Francisco, CA (US)

(72) Inventors: Ho Chi Andrew Chin, New York, NY (US); Matthew Spitz, Brooklyn, NY (US); Andrew Werner, Jersey City, NJ (US)

(73) Assignee: Dropbox, Inc., San Francisco, CA (US)

( * ) Notice: Subject to any disclaimer, the term of this patent is extended or adjusted under 35 U.S.C. 154(b) by 0 days.

(21) Appl. No.: 17/934,404

(22) Filed: Sep. 22, 2022

(65) Prior Publication Data
US 2023/0018582 A1 Jan. 19, 2023

Related U.S. Application Data

(63) Continuation of application No. 16/791,723, filed on Feb. 14, 2020, now Pat. No. 11,461,341, which is a
(Continued)

(51) Int. Cl.
| | |
|---|---|
| *G06F 16/2457* | (2019.01) |
| *G06F 16/901* | (2019.01) |
| *G06F 16/903* | (2019.01) |
| *G06F 16/9038* | (2019.01) |
| *G06F 16/93* | (2019.01) |
| *G06F 16/9535* | (2019.01) |

(Continued)

(52) U.S. Cl.
CPC .... *G06F 16/24578* (2019.01); *G06F 16/9024* (2019.01); *G06F 16/90335* (2019.01);
(Continued)

(58) Field of Classification Search
CPC ............... G06F 16/24578; G06F 16/93; G06F 16/90335; G06F 16/9038; G06F 16/9535;
(Continued)

(56) References Cited

U.S. PATENT DOCUMENTS

| | | | |
|---|---|---|---|
| 6,112,203 | A | 8/2000 | Bharat et al. |
| 8,954,425 | B2 | 2/2015 | Xiao et al. |

(Continued)

FOREIGN PATENT DOCUMENTS

| | | |
|---|---|---|
| WO | 2011151500 A1 | 12/2011 |
| WO | 2015117267 A1 | 8/2015 |

OTHER PUBLICATIONS

Final Office Action for U.S. Appl. No. 15/369,390 mailed on Jul. 19, 2019, 10 pages.
(Continued)

*Primary Examiner* — Joshua Bullock
(74) *Attorney, Agent, or Firm* — Keller Preece PLLC

(57) ABSTRACT

This disclosure generally covers systems and methods that identify relevant information for a user based on an object graph for documents and other files hosted by a document hosting system. In particular, certain embodiments of the disclosed systems and methods generate an object graph comprising interconnected nodes representing relationships among documents and other files on the document hosting system. Using the object graph, the disclosed systems and methods can identify relevant information and provide results or recommendations corresponding to that information based on a query or on user input, respectively.

20 Claims, 10 Drawing Sheets

Related U.S. Application Data continuation of application No. 15/369,390, filed on Dec. 5, 2016, now Pat. No. 10,585,903.

(51) Int. Cl.
  *G06F 40/247* (2020.01)
  *G06F 40/284* (2020.01)

(52) U.S. Cl.
  CPC .......... *G06F 16/9038* (2019.01); *G06F 16/93* (2019.01); *G06F 16/9535* (2019.01); *G06F 40/247* (2020.01); *G06F 40/284* (2020.01)

(58) Field of Classification Search
  CPC ... G06F 16/9024; G06F 40/284; G06F 40/247
  USPC ........................................................ 707/728
  See application file for complete search history.

(56) References Cited

U.S. PATENT DOCUMENTS

| | | | |
|---|---|---|---|
| 9,009,147 B2 | 4/2015 | He et al. | |
| 9,378,277 B1 | 6/2016 | Nguyen et al. | |
| 11,347,626 B2 * | 5/2022 | Cuprak | G06F 16/9024 |
| 2008/0086465 A1 * | 4/2008 | Fontenot | G06F 16/36 707/999.005 |
| 2013/0275429 A1 * | 10/2013 | York | G06F 16/435 707/E17.002 |
| 2016/0078135 A1 * | 3/2016 | Yi | G06F 16/3329 707/731 |
| 2017/0076206 A1 * | 3/2017 | Lastras-Montano | G06F 16/3344 |
| 2018/0157662 A1 | 6/2018 | Chin et al. | |

OTHER PUBLICATIONS

Non-Final Office Action for U.S. Appl. No. 15/369,390 mailed on Jan. 18, 2019. 9 pages.

Non-Final Office Action from U.S. Appl. No. 16/791,723, mailed Feb. 7, 2022, 6 pages.

Notice of Allowance from U.S. Appl. No. 15/369,390, mailed Oct. 28, 2019, 9 pages.

Notice of Allowance from U.S. Appl. No. 16/791,723, mailed Jun. 24, 2022, 8 pages.

* cited by examiner

IDENTIFYING RELEVANT INFORMATION WITHIN A DOCUMENT HOSTING SYSTEM

CROSS REFERENCE TO RELATED APPLICATIONS

The present application is a continuation of U.S. application Ser. No. 16/791,723, filed on Feb. 14, 2020, which is a continuation of U.S. application Ser. No. 15/369,390, filed on Dec. 5, 2016, which issued as U.S. Pat. No. 10,585,903. Each of the aforementioned applications is hereby incorporated by reference in its entirety.

BACKGROUND

Companies, firms, and other organizations increasingly use document hosting systems to store, manage, and identify information (e.g., documents). In some instances, the organization operates the document hosting system on local servers. In other instances, a third party remotely operates the document hosting system on web servers that members of the organization access through the Internet. As organizations expand and produce more content, some document hosting systems store and retrieve an increasing amount of information. Over time, the information within a document hosting system can become a record of an organization's institutional knowledge and, the contents and metadata associated with that information come to identify organization members who are resources for a topic or project.

Conventional document hosting systems often provide folders that organization members can use to curate information within a structure, such as documents or user profiles within a folder hierarchy. For example, an organization's members may curate documents of a document hosting system by topic within a folder hierarchy. In conventional document hosting systems, folder hierarchies commonly comprise parent folders and subfolders that contain documents or other subfolders. As an organization's corpus of documents grows—and different organization members modify the information structure (e.g., folder hierarchy)—the information structure can become a multilayered labyrinth with multiple parent folders and subfolder upon subfolder. Additionally, curated information structures often limit (or organize by default) documents within one folder at the exclusion of another folder despite documents within one folder relating to documents in another folder (e.g., both documents containing similar content). Indeed, conventional document hosting systems often lack mechanisms to represent relationships among documents in different folders or among user profiles and other documents in different folders (e.g., showing how a user profile is connected to documents or folders).

The information structures of conventional document hosting systems can also slow or impede the process of searching for and identifying information. For example, a folder hierarchy of a conventional document hosting system may slow down a user from manually locating a document when the user must open multiple subfolders within a parent folder to locate the document. Additionally, a folder hierarchy of a conventional document hosting system may impede a user from locating a document when the folder hierarchy is organized by folders comprising counterintuitive topics or comprising folders representing overlapping topics. In the latter instance, a user may need to open and search through multiple parent folders and subfolders—sometimes finding nothing of interest—before searching through another branch of the folder hierarchy to locate a document or identify organization members that have written concerning a certain topic.

Beyond a conventional document hosting system's impediments to searching for and identifying information, a conventional document hosting system with a curated information structure can quickly become outdated or obsolete. For example, a folder hierarchy can be impractical to reorganize when a corpus of documents becomes too voluminous. Even when an organization member updates a conventional document hosting system's information structure— by, for example, transferring and reorganizing documents within a new folder hierarchy—the structure can quickly become outdated as projects within the organization change or a team focuses on different subject matter. As a project changes direction or becomes independent from other projects, a corresponding folder hierarchy may no longer represent an organization's workflow or projects. The utility of a conventional information structure can be particularly short-lived—and the structure inhibit locating documents—in larger organizations with hundreds of members and projects.

Accordingly, conventional document hosting systems contain information structures and other limitations that prevent users from retrieving documents or using such documents to identify relevant information.

SUMMARY

This disclosure describes solutions to some or all of the foregoing problems with certain embodiments of systems and methods that identify relevant information for a user. In particular, the disclosed systems and methods identify relevant information for a user based on an object graph for documents and other files hosted by the system. For example, the systems and methods described in this disclosure include embodiments that generate an object graph comprising interconnected nodes representing relationships among documents and associated folders, user profiles, and terms. By using an object graph, the disclosed systems and methods can identify relevant information (e.g., documents, folders, or user profiles) and provide results or recommendations corresponding to that information based on a query or on user input, respectively.

In certain embodiments, the systems and methods analyze documents and associated folders, user profiles, and terms. Based on that analysis, the systems and methods generate an object graph comprising multiple nodes connected by edges. The nodes comprise document nodes, folder nodes, user nodes, and term nodes; the edges represent relationships among the nodes. In some embodiments, the systems and methods receive a query from a user device and calculate a score for some of the nodes using the object graph. Each score represents a relevance of each node to the query and forms the basis for the systems and methods to provide query results (e.g., a list of relevant documents or users with knowledge concerning a queried topic).

In other embodiments, the systems and methods likewise analyze documents and generate an object graph comprising multiple nodes connected by edges, but also provide a document to a user device within an editing user interface. In such embodiments, the system and methods receive user input—including an inserted term—within the editing user interface. Based on that user input, the systems and methods calculate a score for each node using the object graph, with each score representing a relevance of each node to the user input. The systems and methods then identify one or more related nodes based on the calculated scores and provide a recommendation associated with the one or more related nodes to the user device (e.g., by providing a link to a relevant document within the editing user interface).

By using the systems and methods described above, these and other embodiments of this disclosure avoid the cumbersome and inefficient process of identifying or retrieving relevant information using an information structure of a conventional document hosting system. Instead of relying on an information structure to identify documents, the disclosed systems and methods utilize an object graph to identify relevant information based on relationships that the document hosting system has identified among a document corpus, such as by identifying documents that contain terms of a query or that contain terms similar to a query. The disclosed systems and methods accordingly expedite the process of retrieving relevant information through a document hosting system (that automatically identifies relationships within a document corpus) compared to manually searching through a conventional information structure curated by users.

To avoid the impediments of a conventional information structure, certain embodiments of the systems and methods calculate a score for each node within an object graph based on one or more seed nodes. For example, in some embodiments, the systems and methods identify a seed node within the object graph (e.g., a seed node that corresponds to a search term from a query), identify edges that connect the seed node to other nodes within the object graph, and determine a weight for each edge connecting the seed node to the other nodes. When calculating the score for each of the relevant nodes, certain systems and methods determine a weight for each edge by calculating the weight as a function of various factors, such as factors that account for a user's percentage of contribution (e.g., contribution to a line in a document containing a search term), a time associated with an edge connecting the seed node to another node (e.g., a time representing when a user created a document), or an edge type that represents a specific relationship between nodes (e.g., a user-to-document edge directly connecting a user node to a document node).

The following description sets forth additional features and advantages of the present invention. Some of these additional features and advantages will be obvious from the description or may be learned by the practice of such embodiments. A person of ordinary skill in the art may realize and obtain the features and advantages of these embodiments through the systems and methods particularly pointed out in the appended claims.

BRIEF DESCRIPTION OF THE DRAWINGS

Below is a brief description of the figures this disclosure references.

DETAILED DESCRIPTION

Figure 1:
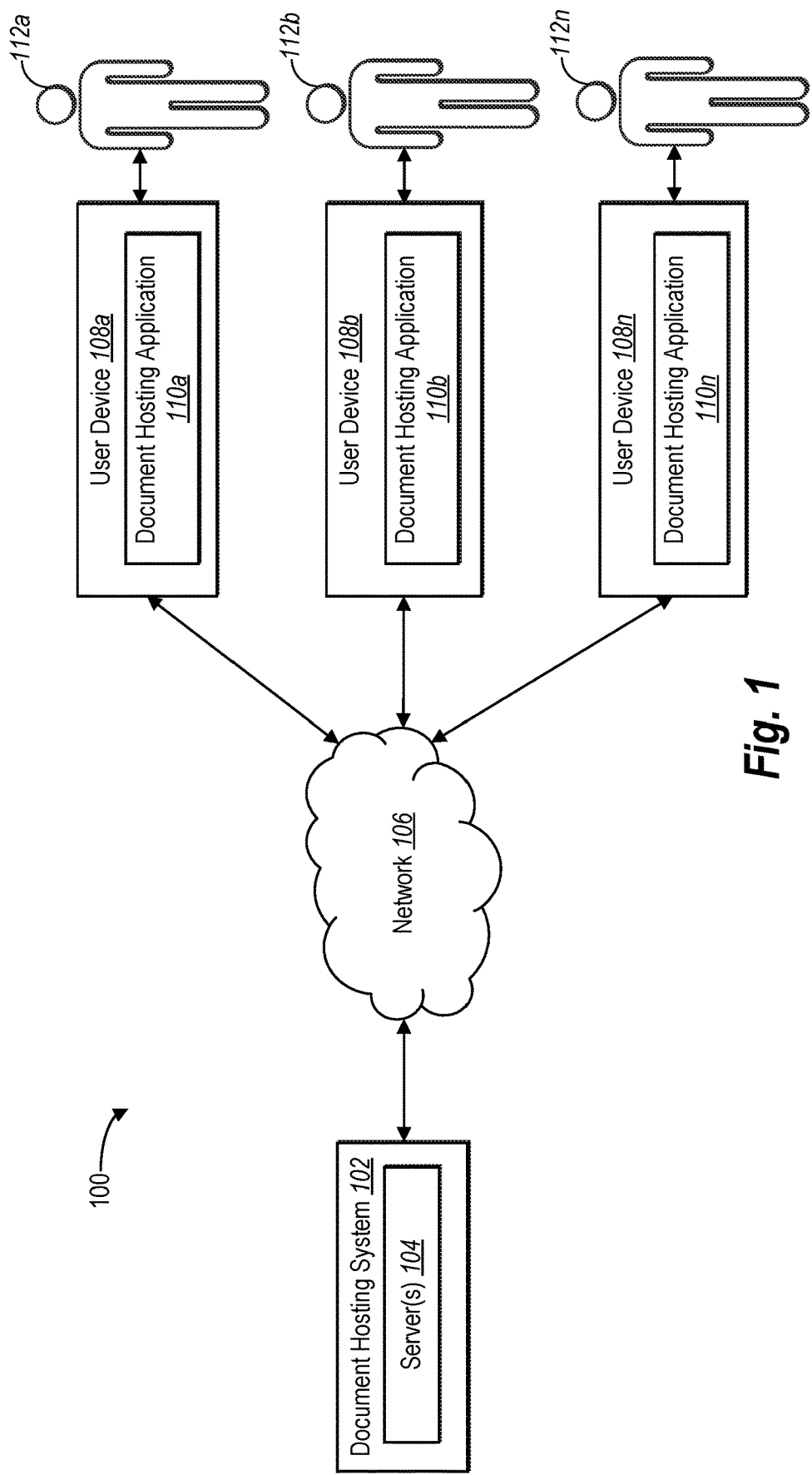
FIG. 1 illustrates a block diagram of an environment for implementing one or more embodiments of this disclosure.

This disclosure describes one or more embodiments of a document hosting system that identifies relevant information for a user based on an object graph for documents and other files hosted by the system. For example, in some embodiments, the document hosting system generates an object graph comprising nodes connected by edges that represent relationships among documents (or other files) and associated folders, user profiles, and terms. By using the object graph, the document hosting system identifies relevant information-based on a query or on user input—and provides results or recommendations corresponding to that information. In some embodiments, the results or recommendations identify documents, folders, or user profiles relevant to the respective query or user input.

For example, in some embodiments, the document hosting system analyzes documents and associated folders, user profiles, and terms. Based on that analysis, the document hosting system generates an object graph comprising multiple nodes connected by edges. The nodes comprise document nodes, folder nodes, user nodes, and term nodes; the edges represent relationships among the nodes. In some embodiments, the document hosting system receives a query from a user device and calculates a score for some of the nodes using the object graph. Each score represents a relevance of each node to the query and forms the basis for the document hosting system to provide query results (e.g., a list of relevant documents or user profiles with knowledge concerning a queried topic).

In other embodiments, the document hosting system likewise analyzes documents and—based on that analysis—generates an object graph comprising multiple nodes connected by edges. In these particular embodiments, the document hosting system provides a document to a user device within an editing user interface. The document hosting system then receives user input—including an inserted term—within the editing user interface. Based on that user input, the document hosting system calculates a score for some of the nodes using the object graph— with each score representing a relevance of each node to the user input. The document hosting system then identifies some related nodes based on the calculated scores and provides a recommendation associated with the related nodes to the user device (e.g., by providing a link to a relevant document within the editing user interface).

As disclosed below, in some embodiments, the document hosting system provides an efficient process for identifying relevant information from among a document corpus and quickly accessing an organization's institutional knowledge from within that document corpus. The disclosed document hosting system provides this expedited identification and access without the need to manually curate information within an information structure. For example, through a query or user input, the disclosed document hosting system can suggest related documents or folders that an organization member may want to review—after accessing or editing another file—or identify another organization member (from a user profile) as an expert on a topic.

By generating an object graph that detects and represents relationships among a document corpus, the document hosting system can infer and identify relationships among the documents—including document relationships unknown to an organization member—and enable organization members to quickly access related documents. Indeed, in some embodiments, the document hosting system identifies nodes from within the object graph based on user input such as an inserted term within an editing user interface—to provide a user device with a notice of and access to relevant information without receiving a query from the user device. By providing such notice and access to relevant information, the document hosting system prevents an organization member from duplicating work done by other organization members.

Additionally, the document hosting system, in certain embodiments, expedites queries and avoid review of irrelevant information (e.g., documents, folders, user profiles). For example, in some embodiments, the document hosting system excludes—from query results or recommendations—documents that a user device has previously viewed. Moreover, in some embodiments, the document hosting system determines that inserted terms from a user input include common terms (e.g., the words "the," "is," "it") and calculates a score for each node that represents a relevance to inserted terms within an editing user interface, other than the common terms. When providing recommendations within a user interface or providing query results to a user device, some of the disclosed document hosting systems provide a link to (or a thumbnail for) a relevant document, folder, or user profile (e.g., a user profile for an organization member with expertise on a certain topic).

To calculate a relevance score based on a query or user input, in some embodiments, the document hosting system calculates a score for each node within an object graph based on a seed node. For example, the document hosting system can identify a seed node within the generated object graph (e.g., a seed node that corresponds to a search term from a query), identify edges that connect the seed node to other nodes within the object graph, and determine a weight for each edge connecting the seed node to the other nodes. When determining the weight for each edge, some of the disclosed document hosting systems calculate the weight as a function of various factors, such as factors that account for a user's percentage of contribution (e.g., contribution to a line in a document containing a search term), a time associated with an edge connecting the seed node to another node (e.g., a time representing when a user created a document), or an edge type that represents a specific relationship between nodes (e.g., a user-to-document edge directly connecting a user node to a document node).

This disclosure uses several terms with the following definitions. The term "edge" refers to a connection or link between or among nodes of an object graph. An edge represents a relationship between or among nodes of an object graph. For example, an edge that directly connects a user node to a document node may represent that a user corresponding to the user node edited a document corresponding to the document node.

The term "node" refers to a representation of a document or other data object (e.g., a folder, a user profile, or a term) within a document hosting system, where the representation is displayed within an object graph. A node may represent any data object stored on or used in the document hosting system. For example, a node may represent a document, folder, user profile, or term. Accordingly, in some embodiments, a node may represent documents that the document hosting system hosts and stores on a database or that are used in the document hosting system.

The term "object graph" refers to a graph that represents documents and other data objects stored, hosted, and/or managed by a document hosting system with nodes and represents relationships among the data objects with edges. In some embodiments, the data objects represented by nodes in the object graph include documents and other files, folders, user profiles, and terms. In particular, the object graph may comprise folder nodes that represent folders, document nodes that represent documents, user nodes that represent user profiles, and/or term nodes that represent terms. Additionally, an object graph may comprise edges that connect nodes and represent a relationship between or among nodes (e.g., an edge directly connecting a user node and a document node can represent that the user corresponding to the user node created, accessed, or edited, for example, the document corresponding to the document node).

The term "relevance score" refers to a score that represents a relevance of a node (within an object graph) to a query or to a user input. A document hosting system calculates a relevance score, for example, by calculating a score for a node based on edges connecting the node to a "seed node" within the object graph, where the seed node corresponds to a query or user input. The seed node may represent, for example, a term from a query, a term inserted into a document through user input, or a document or folder requested through user input.

Turning now to the figures, FIG. 1 illustrates a block diagram of one embodiment of a system environment 100 in which a document hosting system can operate. As illustrated in FIG. 1, the system environment 100 includes a document hosting system 102, which includes server(s) 104. In some embodiments, the document hosting system 102 stores documents and other data objects that are accessible to and controlled by an organization on the server(s) 104. The system environment 100 further includes user devices 108a, 108b, through 108n (collectively referred to herein as "user devices 108"). As depicted in FIG. 1, each of the user devices 108 have an associated user 112—with a user 112a associated with the user device 108a, a user 112b associated with the user device 108b, and a user 112n associated with the user device 108n. Users may be humans, organizations, organization members, or any other entities. Although FIG. 1 illustrates three user devices 108 and three associated users 112, the system environment 100 may include any number of user devices and any number of users.

As shown in FIG. 1, the system environment 100 includes the document hosting system 102, which can host, organize, and/or otherwise manage various documents available for access, editing, and/or collaboration by users of document hosting system 102. Although various features are described herein as being specific to a document hosting system 102, one will appreciate that in further embodiments the disclosed features can be implemented on any file hosting and/or storage system. In other words, any reference to or description of the document hosting system 102 in this disclosure likewise applies to embodiments of a file hosting system.

As illustrated in FIG. 1, the user devices 108 can communicate with the document hosting system 102, including the server(s) 104, over a network 106. The network 106 may represent a network or collection of networks, such as the Internet, a corporate intranet, a virtual private network (VPN), a local area network (LAN), a wireless local network (WLAN), a cellular network, a wide area network (WAN), a metropolitan area network (MAN), or a combination of two or more such networks. Thus, the network 106 may be any suitable network over which the user devices 108 (or other components) may access the document hosting system 102 or vice versa.

As described below, the server(s) 104 of the document hosting system 102 can enable the various functions, features, processes, methods, and systems described herein. Additionally, or alternatively, the server(s) 104 coordinate with the user devices 108 to perform or provide the various functions, features, processes, methods, and systems described in more detail below. Although FIG. 1 illustrates a particular arrangement of the document hosting system 102, server(s) 104, network 106, and user devices 108, various additional arrangements are possible. For example, the document hosting system 102 and the server(s) 104 may directly communicate with the user devices 108, bypassing the network 106.

Generally, the user devices 108 can include any one of various types of client devices. For example, the user devices 108 can include a mobile device (e.g., a smart phone), tablet, laptop computer, desktop computer, televisions, or any other type of computing device as further explained below with reference to FIG. 8. Additionally, the server(s) 104 can include one or more computing devices including those explained below with reference to FIG. 8. The document hosting system 102, server(s) 104, network 106, and user devices 108 may communicate using any communication platforms and technologies suitable for transporting data and/or communication signals, including any known communication technologies, devices, media, and protocols supportive of data communications, examples of which are described below with reference to FIG. 9.

As an initial overview of some embodiments of the system environment 100, the server(s) 104 provide the user devices 108 access to the document hosting system 102 through the network 106. In one or more embodiments, the server(s) 104 provide one or more folders, documents, or user profiles to the user devices 108 to allow the users 112 to perform actions associated with the folders, documents, or user profiles—such as editing documents, viewing user profiles, entering a query, or entering user input within an editing user interface. The document hosting system 102 can provide, for example, a website that consists of one or more webpages and that enables a user to create, upload, edit, view, delete, collaborate on, or perform other actions with respect to a folder, document, or user profile. As discussed further below with reference to FIG. 2, in some embodiments, the document hosting system 102 analyzes documents, files, and other data objects (e.g., folders, user profiles, and terms associated with the documents) to determine relationships between or among the documents and the other data objects.

As further shown in FIG. 1, each user device 108 has an associated document hosting application 110—with a document hosting application 110a associated with the user device 108a, a document hosting application 110b associated with the user device 108b, and a document hosting application 110n associated with the user device 108n. In some embodiments, the document hosting application 110a comprises a web browser, applet, or other software application (e.g., native application) available to the user device 108a. The user device 108a may launch the document hosting application 110a to facilitate interacting with the document hosting system 102. For example, the document hosting application 110a may coordinate communications between the user device 108a and the server(s) 104 that, for example, access, edit, and upload documents to the document hosting system 102. Document hosting applications 110b and 110n can operate in the same or in a different way as document hosting application 110a.

To facilitate interacting with documents on the document hosting system 102, the document hosting application 110a can present a graphical user interface of the document hosting system 102; detect interactions from the user 112a with the graphical user interface; and communicate requests, queries, or user input based on the detected interactions (with the graphical user interface) to the document hosting system 102. For example, when the document hosting system 102 detects an interaction between the user 112a with the graphical user interface indicating a request to view a document, the document hosting system 102 instructs the server(s) 104 to send data representing the requested document to the user device 108a. The user device 108a receives the data representing the document and—upon detecting user input between the user 112a with the graphical user interface indicating a user input to edit the document—the user device 108a sends data representing the edit to the document hosting system 102. The data representing the edit may include, for example, inserting a certain term into a sentence of the document.

Additionally, in some embodiments, the document hosting system 102 receives a query from the user device 108a and identifies one or more query results-based on the query— and instructs the server(s) 104 to provide query results to the user device 108a that include, for example, one or more links to documents relevant to the query. As discussed further below, in some embodiments, the document hosting system 102 provides results for queries by generating or utilizing an object graph comprising interconnected nodes representing relationships among documents and associated folders, user profiles, and terms, and calculate a score for nodes to identify relevant query results corresponding to the nodes.

Figure 2A:
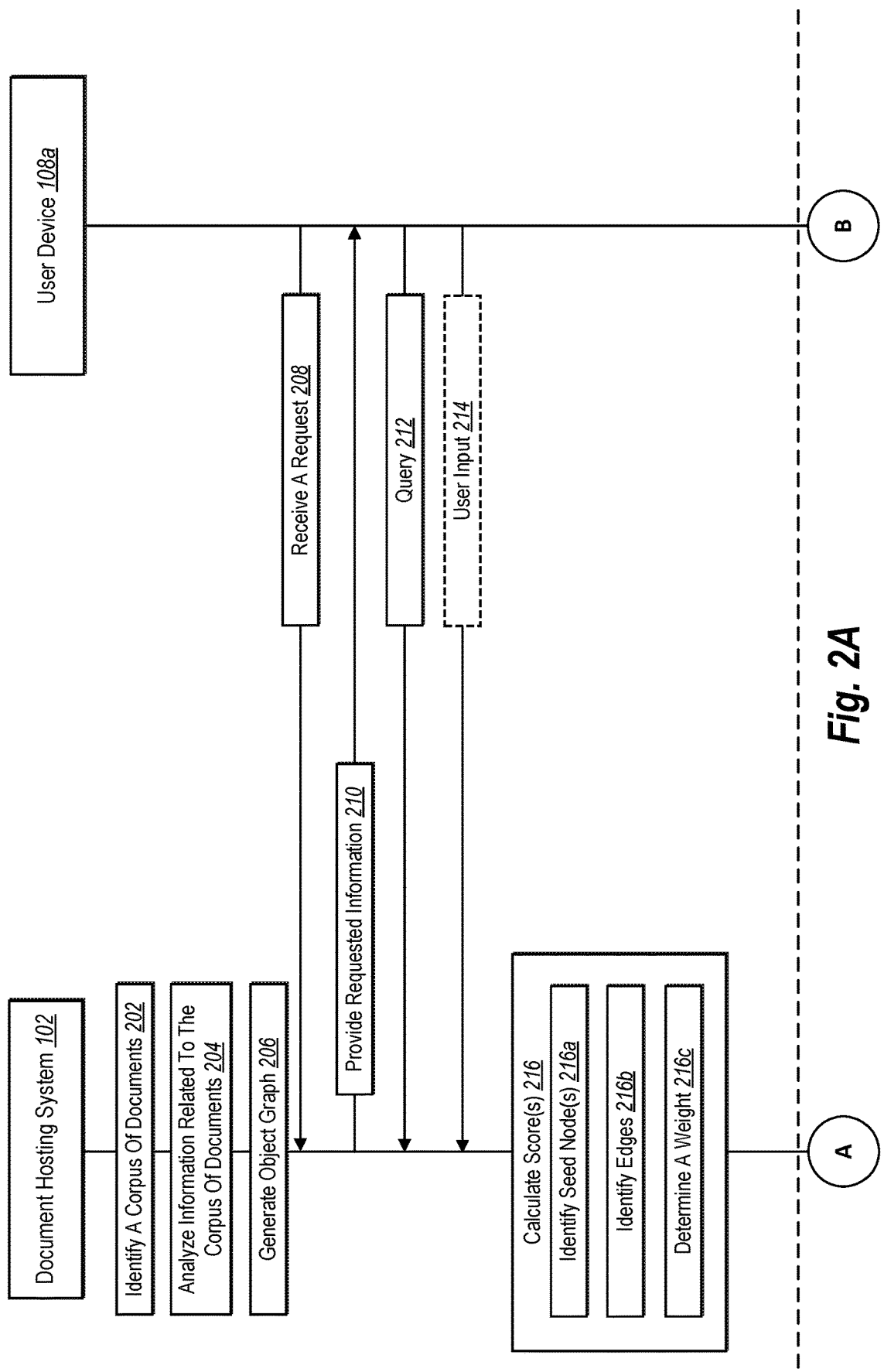
FIGS. 2A-2B illustrate sequence-flow diagrams of interactions between a document hosting system and a user device in accordance with one or more embodiments.
Figure 2B:
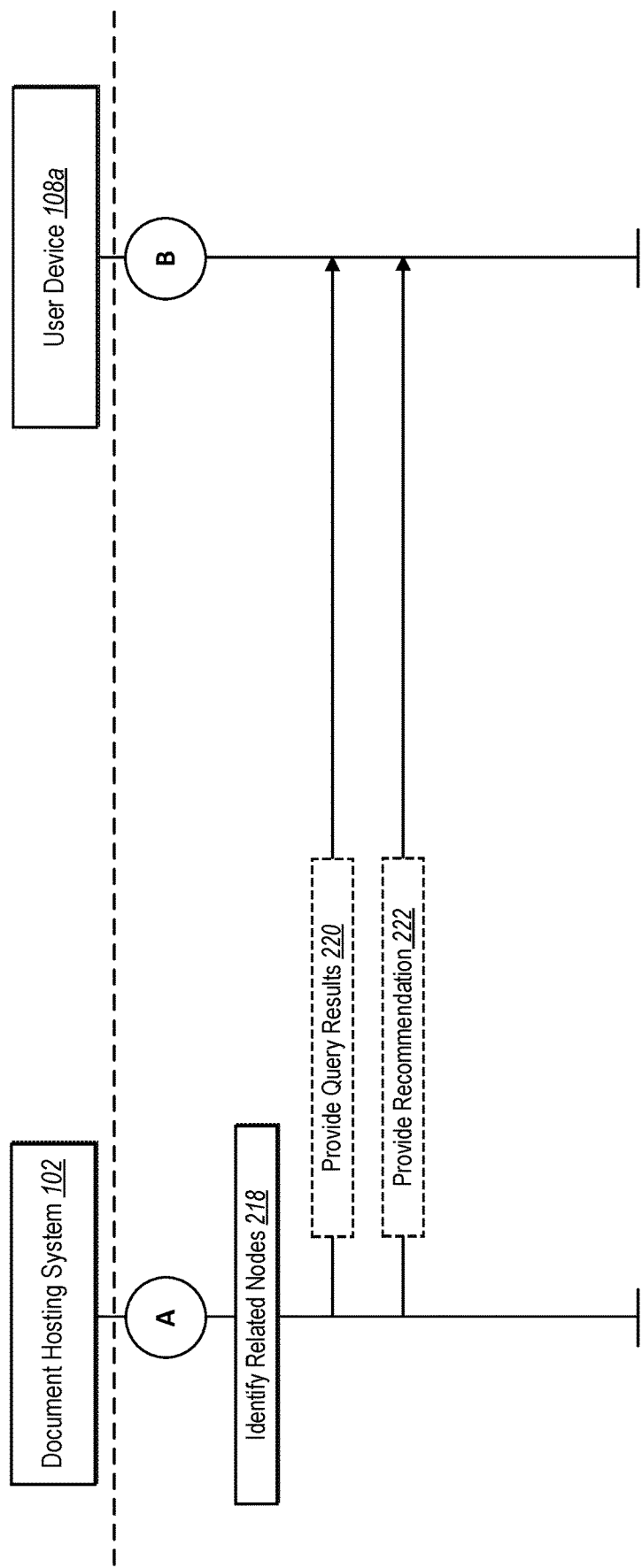

Turning now to FIGS. 2A-2B, these figures provide an overview of certain embodiments of the document hosting system 102 that calculate a relevance score for nodes within an object graph to identify information relevant to a query or user input. FIGS. 2A-2B illustrate a representation of a sequence of steps 202-222 performed by the document hosting system 102 or the user device 108a to identify information relevant to a query or user input. As shown in FIGS. 2A-2B and as indicated above, the system environment 100 includes, in some embodiments, the document hosting system 102 (including the server(s) 104) and the user devices 108. In particular, some embodiments of the document hosting system 102 include computer-executable instructions that, when executed by the server(s) 104 of the document hosting system 102 and/or by the user devices 108, cause the server(s) 104 of the document hosting system 102 and/or the user devices 108 to perform the steps 202-222 shown in the sequence-flow diagram of FIGS. 2A-2B.

In some embodiments, the document hosting system 102 identifies documents. As shown in FIG. 2A, the document hosting system 102 performs the step 202 of identifying a corpus of documents, including any metadata associated with the corpus of documents. For example, step 202 can include the document hosting system 102 uploading, creating, and/or storing folders, documents, and user profiles for an organization—and associated metadata— based on information received from the user device 108a over the network 106. In some embodiments, the corpus of documents may be accessible to and controlled by an organization using credentials verified by the document hosting system 102 (e.g., user name and password). Moreover, in some embodiments, the document hosting system 102 stores a corpus of documents hosted on the server(s) 104.

Additionally, in some embodiments, the document hosting system 102 analyzes information hosted by the document hosting system 102 (e.g., to determine relationships between users, documents, folders, and/or terms). As shown in FIG. 2A, for example, the document hosting system 102 performs the step 204 of analyzing information related to the corpus of documents hosted by the document hosting system 102. In particular, the step 204 can include analyzing documents and associated folders, user profiles, and terms, such as documents and associated items stored by the document hosting system 102. In some embodiments, the document hosting system 102 analyzes the contents of the corpus of documents and metadata associated with the corpus of documents.

As mentioned, in some embodiments, the document hosting system 102 analyzes the contents of the corpus of documents to, for example, detect and categorize the contents of the corpus of documents. For example, the document hosting system 102 can apply natural language processing to detect the contents of the corpus of documents and to identify keywords or keyphrases from within the contents of the corpus of documents. By using grammar rules and an electronic dictionary or thesaurus (or similar information), in some embodiments, the document hosting system 102 detects and differentiates between common terms, keywords or keyphrases, articles, prepositional phrases, and other grammatical constructs within a document or another data object. For example, the document hosting system 102 can utilize term frequency-inverse document frequency ("tf-idf") principles to distinguish between common terms and important keywords used in a document. Specifically, the document hosting system 102 can assign a greater weight of importance to terms that occur frequently in a document while assigning lower weights to terms that occur frequently across a set of documents. Accordingly, the document hosting system 102 can identify terms that are unique to a document but that occur frequently within the document as being relatively important keywords for the document. By contrast, the document hosting system 102 identifies terms that occur frequently within all documents of a document set as being common terms and relatively unimportant. In some embodiments, the document hosting system 102 identifies common terms by referencing a premade list of common terms (e.g., "the," "it" "is," "of," "for," "each," "you," "your," "yours," "me," "my," "mine"). Additionally, the document hosting system 102 can count a number of occurrences of images or other data objects within the contents of the corpus of documents and utilize that data to identify relationships between the images and data objects to documents, users, etc.

Relatedly, when performing the step 204, the document hosting system 102 can identify and categorize metadata associated with the corpus of documents. In some embodiments, the document hosting system 102 analyzes metadata to identify actions or relationships among user profiles, folders, documents, and/or terms. For example, the document hosting system 102 may identify (from within the document corpus's metadata) that a user created, authored, viewed, or edited a document. As another example, the document hosting system 102 may identify (from within the document corpus's metadata) that a term is used within a title, heading, subheading, or body of a document. As discussed further below, in certain embodiments, the document hosting system 102 identifies numerous other actions or relationships among user profiles, folders, documents, and terms.

Additionally, as part of the analysis in some embodiments of step 204, the document hosting system 102 detects the contents of the corpus of documents by applying data recognition techniques. For example, the document hosting system 102, in some embodiments, applies optical character recognition ("OCR") or object recognition to documents containing text or images that the system 102 could otherwise not recognize.

As also noted above, in some embodiments, the document hosting system 102 generates an object graph comprising nodes and edges. As shown in FIG. 2A, for example, the document hosting system 102 performs the step 206 of generating an object graph comprising nodes connected by edges. When performing step 206, in certain embodiments, the document hosting system 102 generates an object graph that comprises nodes corresponding to data objects within the document hosting system 102 and edges that connect some of the nodes to each other. In some embodiments, the document hosting system 102 generates an object graph comprising document nodes, folder nodes, user nodes, and term nodes, which respectively correspond to documents, folders, user profiles, and terms within the document hosting system 102. In further embodiments, the document hosting system 102 can generate nodes corresponding to any other information or data desired for storage within the object graph.

As indicated above, in some embodiments, the document hosting system 102 generates edges that represent relationships between or among nodes. An edge may represent a relationship—such as an action, association, or commonality—between nodes, including relationships among the document nodes, folder nodes, user nodes, and/or term nodes. In some embodiments, the generated object graph comprises user-to-user edges, user-to-folder edges, user-to-document edges, user-to-term edges, folder-to-folder edges, folder-to-document edges, folder-to-term edges, document-to-document edges, document-to-term edges, term-to-term edges, or any other combination of node-to-node edges. The following paragraphs describe an analytical basis for—and varieties of—each of these edges.

As noted above, in some embodiments, the document hosting system 102 generates an object graph based on an analysis of data objects. As described in part with reference to step 204—when performing an analysis of documents—the document hosting system 102 can identify relationships among the documents and other data objects. For example, during an analysis of user profiles, in some embodiments, the document hosting system 102 identifies that a couple of users are team members; have worked on or are assigned to the same project; are superior or subordinate to one or the other user; have collaborated on (or both contributed to) a folder, document, or project; or work from the same location, such as the same office or city. Based on the analysis of the user profiles, the document hosting system 102 can generate edges that respectively correspond to each of the identified relationships and connect user nodes within the object graph—including a team member edge, project edge, superior-to-subordinate edge, or document collaboration edge.

Similarly, during an analysis of user profiles and folders, certain embodiments of the document hosting system 102 identify that a user created a folder; edited a folder's contents; edited a folder's metadata; viewed a folder's contents; viewed a folder's metadata; emailed a folder; or posted a folder, such as by posting a folder to an internal or external website. Based on the analysis of the user profiles and folders, the document hosting system 102 generates edges that respectively correspond to each of the identified relationships and connects user nodes to folder nodes within the object graph—including a folder creation edge, edited folder content edge, edited folder metadata edge, viewed folder content edge, viewed folder metadata edge, emailed folder edge, or posted folder edge.

Some embodiments generate edges between user nodes and document nodes using a similar process. During an analysis of user profiles and documents, for example, the document hosting system 102 can identify that a user authored a document, created a document, edited a document's contents, edited a document's metadata, viewed a document's contents, viewed a document's metadata, emailed a document, posted a document (e.g., to an internal or external website), or was granted permission to view a document. Based on the analysis of the user profiles and documents, the document hosting system 102 generates edges that respectively correspond to each of the identified relationships and connect user nodes to document nodes within the object graph—including a document authorship edge, document creation edge, edited document content edge, edited document metadata edge, viewed document content edge, viewed document metadata edge, emailed document edge, posted document edge, or permission edge.

Additionally, in some embodiments, the document hosting system 102 generates edges that connect user nodes to term nodes using a similar process. During an analysis of user profiles and terms, the document hosting system 102 can identify that a user authored a line or document containing a term or deleted a term from a line or document. Based on the analysis of the user profiles and terms, the document hosting system 102 generates edges that respectively correspond to each of the identified relationships and connects user nodes to term nodes within the object graph—including a term authorship edge or term deleted edge. In some examples, a term authorship edge might indicate statistics related to a user's use of a term, such as a frequency of use or a number of times the user used the term.

A similar process applies when, in certain embodiments, the document hosting system 102 generates edges to connect folder nodes to other folder nodes, document nodes, or term nodes. During an analysis of folders, documents, and/or terms, the document hosting system 102 can, for example, identify that a folder contains a subfolder, shares a parent folder with another folder, contains a document, has had a document removed from the folder's contents, uses a term within the folder's title, mentions a term within the folder's metadata, or has had a term removed from the folder's metadata. Based on the analysis of the folders, documents, and/or terms, the document hosting system 102 generates edges that respectively correspond to each of the identified relationships and connect folder nodes within the object graph—including a term authorship edge, term deleted edge, subfolder edge, shared parent folder edge, document container edge, document removed edge, folder title edge, metadata mention edge, or deleted metadata edge.

Likewise, in some embodiments, the document hosting system 102 generates edges that connect document nodes to other document nodes or terms nodes using a similar process. During an analysis of documents and/or terms, the document hosting system 102 identifies that a document shares a parent folder with another document, is a version of another document, contains a hyperlink to another document, contains a term within the document's title, contains a term within the document's contents, contains a term within the document's metadata, has had a term deleted from the document's title, has had a term deleted from the document's contents, or has had a term deleted from the document's metadata. Based on the analysis of the documents and/or terms, in some embodiments, the document hosting system 102 generates edges that respectively correspond to each of the identified relationships and connects document nodes within the object graph—including a shared parent folder edge, document version edge, document hyperlink edge, document title edge, document content edge, document metadata edge, deleted title edge, deleted content edge, or deleted metadata edge.

More of the same pattern applies when certain embodiments of the document hosting system 102 generate edges to connect term nodes to other term nodes. During an analysis of terms, document hosting system 102 can identify that a term has been replaced by another term in a document, folder, or user profile; a term is synonymous with another term; a term is antonymous; or that a term is in proximity to another term within a document, folder, or user profile, such as a term within five terms of another term within a document. Based on the analysis of terms, in some embodiments, the document hosting system 102 generates edges that respectively correspond to each of the identified relationships and connects term nodes within the object graph—including a term replacement edge, synonym edge, antonym edge, or proximity edge.

As further shown in FIG. 2A, the document hosting system 102 can perform the step 208 of receiving a request from the user device 108*a*. The document hosting system 102 can then perform the corresponding step 210 of providing the requested information. For example, the user device 108*a* may request to access a folder, document, or user profile hosted by the document hosting system 102, and—in response—the document hosting system 102 may provide a copy of the corresponding folder, document, or user profile to the user device 108*a*. A document hosting system 102 may provide a document, for example, to the user device 108*a* for viewing or editing within an editing user interface. In some examples, the document hosting system 102 provides access to a document by way of a web-based application, whereby a user can access and interact with a document using a web browser. In other examples, the document hosting system 102 provides data representative of a document to a native application on the user device 108*a* and the user can access and interact with the document using the native application.

As noted above, in some embodiments, a user device sends a query or user input to the document hosting system 102, which then identifies relevant information based on the query or user input. As shown in FIG. 2A, for example, the user device 108*a* performs the step 212 of sending a query to the document hosting system 102 or (alternatively) the step 214 of sending user input to the document hosting system 102. In some instances, the query of step 212 comprises a query in a query field for a folder, document, user, or term. Indeed, in some embodiments, the document hosting system 102 provides a query field specific to a folder, document, user profile, or term. Alternatively, in some embodiments, the document hosting system 102 provides a query field that recognizes a query with a specified document type (e.g., .PDF, .DOC, .MPEG). Additionally, in some embodiments, the user input of step 214 comprises requesting a certain document (e.g., folder, document, user profile) or inserting a term within an editing user interface.

As also noted above, in some embodiments, the document hosting system 102 calculates a score for some nodes within an object graph, where each score represents a relevance of a node to a query or user input. As shown in FIG. 2A, for example, the document hosting system 102 can perform the step 216 of calculating score(s) for nodes within an object graph. For example, the step 216 may include the document hosting system 102 calculating a score for some of the nodes within the object graph, where each calculated score represents a relevance of each node to a query received from a user device. As another example, the step 216 may include the document hosting system 102 calculating a score for some of the nodes within the object graph, where each calculated score represents a relevance of each node to a user input, such as the user input of requesting a folder, document, or user profile, or inserting or selecting a term within an editing user interface. In some embodiments, the score represents a relevance of each node to a query or user input, excluding a common term or common terms within the query or user input.

To calculate the relevance score for an individual node, the document hosting system 102 determines values associated with some or all of the nodes (within an object graph) as part of an algorithm. In some such embodiments, the document hosting system 102 uses an algorithm that can be applied to the nodes and edges of an object graph. For example, in some embodiments, the document hosting system 102 calculates and/or assigns a weight for each edge that connects one node to another node within an object graph (or portion of the object graph) as a function of one or more factors. Based on the determined weight for each edge within the object graph (or portion of the object graph), the document hosting system 102 generates a probability distribution indicating the likelihood that a user would navigate from one node to another node within the object graph. To do so, the document hosting system 102 may run several iterations of a random walk within the object graph (or portion of the object graph) to calculate the probability that a user would navigate from one node to another based on the determined weight for each edge.

A person having ordinary skill in the art will recognize, however, that the document hosting system 102 may use any algorithm suitable for analyzing an object graph to quantify, define, and/or rank the relationships among nodes of the object graph. For example, in some embodiments, the document hosting system 102 inputs weights associated with some or all of the edges from a generated object graph into any algorithm that aggregates the effect of the connections among nodes to determine an overall relevance between two specific nodes. In particular, in some embodiments, the document hosting system 102 applies PageRank or a modified form of PageRank to the object graph to calculate the relevance score for nodes within a portion or all of the object graph.

In some embodiments, the document hosting system 102 calculates a score for a node through a series of steps shown in FIG. 2A. For example, the step 216 of calculating a score for node(s) may include the document hosting system 102 performing the step 216a of identifying seed node(s) within the object graph, the step 216b of identifying edges connecting the seed node(s) to other nodes, and the step 216c of determining a weight for each of the identified edges. When calculating a score for a node, the document hosting system 102 may perform some or all of steps 216a-216c. This disclosure will describe each of steps 216a-216c in the following paragraphs.

In some embodiments of step 216a, the document hosting system 102 identifies a seed node (or seed nodes) that represent or correspond to a query or user input. Although the document hosting system 102 may identify multiple seed nodes in any embodiment discussed herein, this disclosure will primarily refer to a single seed node for simplicity. As an example of step 216a, the document hosting system 102 may identify a seed node that represents a folder, document, user profile, or term from a query received from the user device 108a. In some instances, however, the document hosting system 102 will not be able to identify a seed node that directly represents a folder, document, user profile, or term from a query. In such instances and in some embodiments, the document hosting system 102 identifies multiple seed nodes that represent folders, documents, user profiles, or terms that relate to the queried folder, document, user profile, or term. For example, in some instances, the document hosting system 102 identifies related documents, folders, user profiles, or terms by using an electronic dictionary or thesaurus to identify a synonym, homonym, antonym, homophone, heteronym, or homograph of a term or of a title or name of a folder, document, or user profile.

As another example, the document hosting system 102 may identify a seed node that corresponds to user input from the user device 108a, such as a seed node that represents an inserted term within an editing user interface; a seed node that represents a folder, document, or user profile accessed by the user device 108a; or a seed node that corresponds to a query result selected by a user.

Upon identifying a seed node, the document hosting system 102 performs the step 216b of identifying edges connecting the seed node to other nodes within an object graph. When performing step 216b, the document hosting system 102 can identify any edge that connects other nodes within the generated object graph to the seed node, including but not limited to any edge described above. In some embodiments, the document hosting system 102 identifies both edges that directly connect other nodes to the seed node and edges that indirectly connect other nodes to the seed node (e.g., through multiple degrees of separation). In doing so, the document hosting system 102 identifies an edge that directly connects another node to the seed node as an edge with a first degree of separation, two edges that indirectly connect another node to the seed node—with the two edges connecting another node to the seed node through yet another node— as edges with a second degree of separation, and so on and so forth for a third, fourth, fifth, or any additional degree of separation.

After identifying edges that connect the seed node to other nodes, the document hosting system 102 performs the step 216c of determining a weight for each of the identified edges. A weight may include any value or coefficient, positive or negative, whole number, decimal, or fraction. In some embodiments, certain weights (corresponding to edges) exceed other weights (corresponding to other edges). For example, the weight for an edited document content edge may exceed the weight for a viewed document content edge in value. The comparative value of the weights for the edited document content edge and the viewed document content edge are merely examples. Embodiments of the document hosting system 102 may determine any weight of greater or lesser value for any edge compared to another weight for another edge.

The step 216c may include determining a weight for each edge that accounts for one or more factors. In some such cases, the document hosting system 102 determines a weight for each edge as a function of one or more factors. For some embodiments, the document hosting system 102 uses a function particular to an edge type, such as a function particular to an edited folder metadata edge, an edited document content edge, or any other edge described above. For other embodiments, the document hosting system 102 uses a basic function for all edge types, but accounts for an edge type—whether that be a superior-to-subordinate edge, posted folder edge, or some other edge—as a factor within the function.

Regardless of whether a function is particular to an edge type or generally applied to any edge type, in certain embodiments, the document hosting system 102 may account for various factors when calculating a weight for an edge. For example, the factors of step 216c may include a contribution factor that corresponds to a percentage of contribution by a user. In some instances, the percentage of contribution represents a percentage of one or more lines authored by a user, a percentage of terms within a document or document corpus authored by a user, a percentage of documents created or authored by a user within a folder, or a percentage of documents authored by a user containing a term.

Moreover, the factors of step 216c may include an edge type factor. In some embodiments of the document hosting system 102, the edge type factor corresponds to a type for a particular edge, whether the edge be a user-to-document edge, or more particularly, a folder title edge, shared parent folder edge, or any other edge described above. Accordingly, an edge type factor may be greater or lesser in value depending on the edge type of a particular edge (e.g., a value for a factor for an edited document content edge exceeding a value for a factor for a viewed document content edge).

Additionally, the factors of step 216c may include a time decay factor. In some embodiments, the time decay factor corresponds to a time representing when a relationship was established, with the relationship represented by an edge between or among the seed node and another node. When applying step 216c, in some embodiments, the document hosting system 102 decreases a time decay factor as the time since the relationship was established increases, such that edges that represent more recently established relationships have a higher time decay factor. By decreasing the time factor in this embodiment, the document hosting system 102 reduces the effect of older relationships relative to new relationships (e.g., to identify an organization member with more recent expertise concerning a topic).

By contrast, in some embodiments, the document hosting system 102 increases a time decay factor as the time since the relationship was established increases, such that edges that represent more recently established relationship have a lower time decay factor. By increasing the time factor in this embodiment, the document hosting system 102 increases the effect of older relationships relative to new relationships (e.g., to identify an organization member with more experience or familiarity over time with a topic).

The factors of step 216c may also include a quantity factor that corresponds to a number of occurrences associated with an edge or a frequency factor that corresponds to a frequency of occurrences associated with an edge. In some instances, the number of occurrences may represent the number of occurrences of a term within a document or documents' content or metadata, the number of occurrences of a term within the title of documents within a folder, the number of occurrences users have collaborated together (e.g., on a document, project, team), the number of occurrences a user has edited the contents or metadata of a document or folder, the number of occurrences a user has viewed the contents or metadata of a document or folder, the number of document versions, or the number of terms separating a term from another term. Similarly, in some instances, the frequency of occurrences may represent the frequency of occurrences of a term within a document or documents' content or metadata compared to other terms, the frequency of occurrences of a term within the title of documents within a folder compared to other terms, the frequency of occurrences users have collaborated together (e.g., on a document, project, team) compared to collaboration with other users, the frequency of occurrences a user has edited the contents or metadata of a document or folder compared to edits of other documents or folders, or the frequency of occurrences a user has viewed the contents or metadata of a document or folder compared to views of another document or folder.

Additionally, the factors of step 216c may include a usage factor that corresponds to a usage type associated with an edge. The usage type may include, for example, usage of a term in a title, heading, or body of a document or usage of a document in an email or post. In some embodiments, the usage factor for a term used as a document's title exceeds the usage factor for a term used in a document's heading. In such embodiments, the usage factor for a term used in a document's heading exceeds the usage factor for a term used in a document's body. In other embodiments, the comparative value of usage factors is the inverse, such that the usage factor for a term used in a document's body exceeds both the usage factor for a term used in a document's heading or the usage factor for a term used in a document's title.

Each of the factors described above represents one possible factor that, in some embodiments, the document hosting system 102 accounts for when performing the step 216c of determining a weight for an edge. In other embodiments, however, the step 216c may include identifying a weight for each edge from within a database—including a document authorship edge, a viewed document metadata edge, or any other edge described above—and assigning the corresponding weight to the identified edge. After identifying or assigning a weight to each of the identified edges, in some embodiments, the document hosting system applies any of the factors described above to each assigned weight.

Moreover, when performing step 216c, in some embodiments, the document hosting system 102 applies factor(s) to each assigned weight for each identified edge connected to a node (e.g., a seed node). For example, the document hosting system 102 may apply factor(s) to each assigned weight as input(s) within the algorithm used to calculate a relevance score for a node.

As described above, the document hosting system 102 may determine each weight for each edge automatically, but the system 102 may also receive a value for each weight from a user device (as determined by a user). A user may, for example, assign a weight to an edge using the document hosting application 110a, such as by assigning a weight to a single edge (e.g., a single document authorship edge) or a collection of edges of the same variety (e.g., all document authorship edges). When performing the step 216 of calculating a score for node(s)—whether including steps 216a-216c or not—the document hosting system 102, in some embodiments, calculates scores for different nodes within an object graph. For example, the document hosting system 102 can calculate a score for each node within an object graph. Other embodiments of the document hosting system 102 calculate a score for each node (within an object graph) connected to the seed node. Yet other embodiments of the document hosting system 102 calculate a score for each node (within an object graph) connected to the seed node up to a certain degree of separation (e.g., calculating a score for each node connected to the seed node up to and including six degrees of separation between the node and the seed node) and/or account for edges connected to each node up to a certain degree of separation (e.g., calculating a score for each node by accounting for edges that connect a node to the seed node within five degrees of separation).

In some embodiments, the document hosting system 102 calculates a score for nodes beyond a certain degree of separation from the seed node, but not for nodes within a certain degree of separation from the seed node. For example, the document hosting system 102 may calculate a score for each node connected to the seed node between a third degree of separation and a sixth degree of separation, but not for nodes connected to the seed node within a first or second degree of separation. The document hosting system 102 may calculate scores for nodes beyond a certain degree of separation when, for example, the seed node represents a document that a current user authored and the document hosting system 102 assumes that the current user is familiar with folders, documents, or user profiles corresponding to nodes within a certain degree of separation, such as two degrees of separation. Such calculations avoid providing a current user with results with which she is already familiar.

After calculating a score for each node, in some embodiments, the document hosting system 102 identifies nodes related to a seed node. As shown in FIG. 2B, for example, the document hosting system 102 can perform the step 218 of identifying nodes related to a seed node. By extension, the document hosting system 102 identifies nodes related to a query or user input—when performing step 218—because the seed nodes represent or correspond to items queried or entered by user input (e.g., a seed node that represents a queried term or inserted term). In some embodiments, the document hosting system 102 identifies nodes related to the seed node up to a threshold number, such as identifying the ten nodes related to the seed node with the highest calculated relevance scores. In other embodiments, the document hosting system 102 identifies a number of nodes related to the seed node with the highest or lowest inverse relevance scores.

As noted above, in certain embodiments, the document hosting system 102 provides query results or recommendations based on a query or user input, respectively. As shown in FIG. 2B, for example, the document hosting system 102 can perform the step 220 of providing query results or the step 222 of providing a recommendation. When performing the step 220 of providing query results or the step 222 of providing a recommendation, in some embodiments, the document hosting system 102 provides a list of query results or list of recommendations comprising a link, thumbnail, summary, digital address, or image of a folder, document, or user profile. In some instances, the folder, document, or user profile listed among the query results or recommendations correspond to a folder node, document node, or user node, respectively, that the document hosting system 102 identified in step 218.

In some embodiments, the document hosting system 102 excludes certain results or recommendations from among the query results or recommendations. For example, in some embodiments, the document hosting system 102 excludes from the query results or recommendations a result or recommendation corresponding to an authored, created, viewed, or edited document—when the document hosting system 102 has identified that a user authored, created, viewed, or edited a particular document within a certain time frame. As another example, in some embodiments, the document hosting system 102 excludes from the query results or recommendations a result or recommendation corresponding to a user profile for a user who performed the query or entered the user input upon which the results or recommendations are based, or for a user profile of a team member, superior, or subordinate of a user who performed the query or entered the user input upon which the results or recommendations are based. As yet another example, in some embodiments, the document hosting system 102 excludes from the query results or recommendations a result or recommendation corresponding to a user profile of a team member, superior, or subordinate of a user who performed the query or entered the user input upon which the results or recommendations are based.

Figure 3:
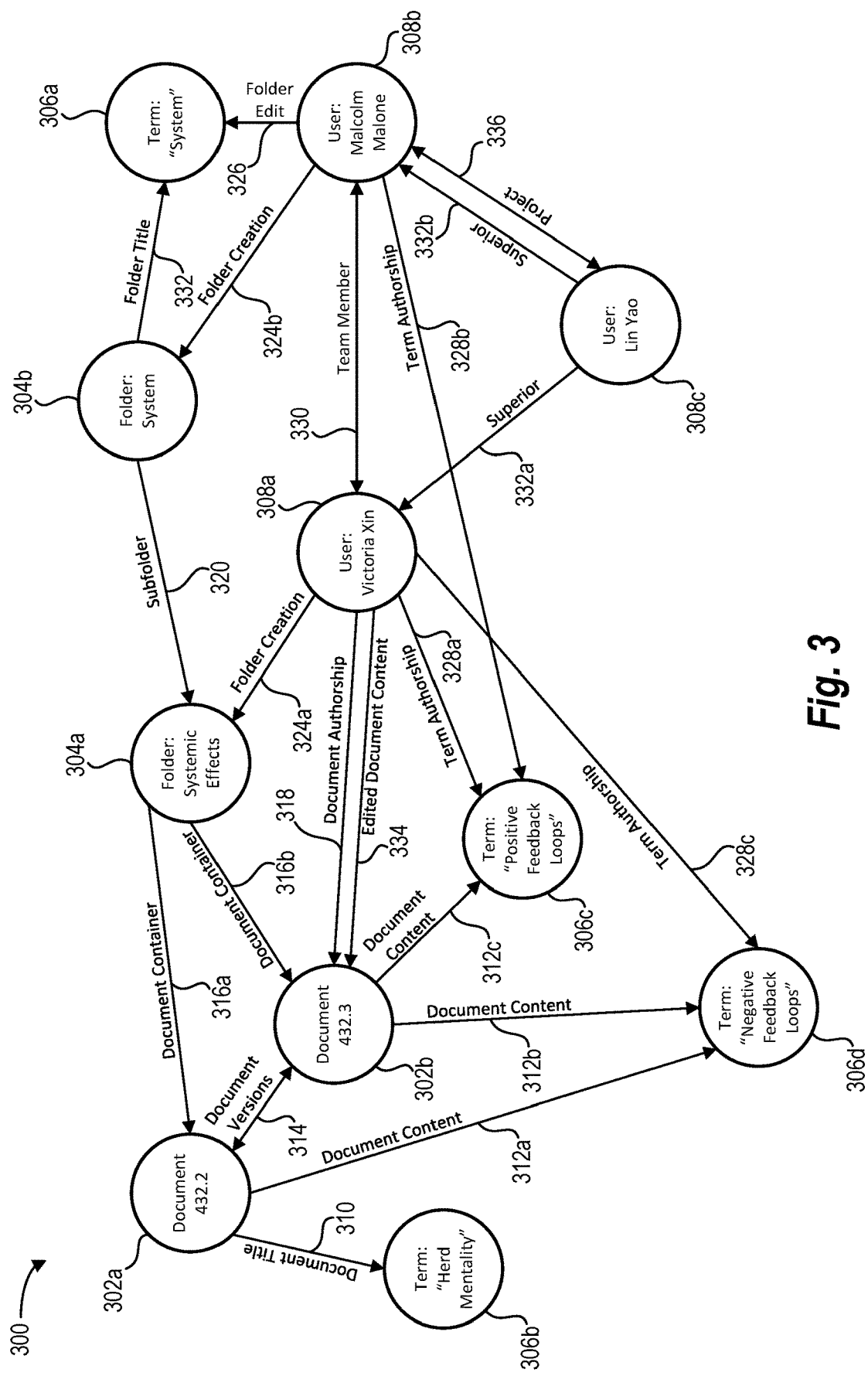
FIG. 3 illustrates an object graph in accordance with one or more embodiments.

Turning now to FIG. 3, this figure illustrates an example of an object graph 300. As shown in FIG. 3, the object graph 300 comprises nodes 302a-308c interconnected by edges 310-336. In some embodiments, the document hosting system 102 can generate the object graph 300 based on an analysis of a document corpus hosted by the system 102 and identified documents and associated folders, user profiles, and terms within the document corpus, as well as identified relationships among the documents and associated folders, user profiles, and terms. Based on that analysis, the document hosting system 102 generated the object graph 300, where each of the nodes 302a-308c represents a folder, document, user profile, or term within the document corpus.

Specifically, the object graph 300 comprises a document node 302a that represents Document 432.2, a document node 302b that represents Document 432.3, a folder node 304a that represents a folder entitled "Systemic Effects," a folder node 304b that represents a folder entitled "System," a term node 306a that represents a term "System," a term node 306b that represents a term "Herd Mentality," a term node 306c that represents a term "Positive Feedback Loops," a term node 306d that represents a term "Negative Feedback Loops," a user node 308a that represents a user profile for "Victoria Xin," a user node 308b that represents a user profile for "Malcom Malone," and a user node 308c that represents a user profile for "Lin Yao."

As further shown in FIG. 3, the edges 310-336 interconnect the nodes 302a-308c. Each edge connects a couple of nodes and represents a relationship that the document hosting system 102 identified between the documents or data objects corresponding to the nodes 302a-308c when analyzing the document corpus. Specifically, the object graph 300 comprises a document title edge 310; document content edges 312a, 312b, and 312c; a document version edge 314; document container edges 316a and 316b; a document authorship edge 318; a subfolder edge 320; a folder title edge 322; folder creation edges 324a and 324b; an edited folder content edge 326; term authorship edges 328a, 328b, and 328c; a team member edge 330; superior-to-subordinate edges 332a and 332b; an edited document content edge 334; and a project edge 336. The individual names of the edges 310-336 correspond to edges of the same name—and the relationships they represent—described above.

As also described above, in some embodiments, the document hosting system 102 performs the step 216—including steps 216a-216c—to calculate score(s) for nodes within an object graph, where each score represents a relevance of each node to a query or to a user input. In one embodiment, the document hosting system 102 calculates a relevance score for each node within the object graph 300 based on a query for the term "Positive Feedback Loops." In this particular embodiment, the document hosting system 102 identifies the term node 306c as a seed node and assigns the seed node a score of zero to remove (from the eventual query results) a result corresponding to the term node 306c. In such embodiments, when calculating a score for each of the nodes 302a-308c within the object graph 300—except for the term node 306c—the document hosting system 102 identifies edges connected to the term node 306c (both directly and indirectly) and determines a weight for each identified edge.

By way of example, if the document hosting system 102 were to calculate a score for the document node 302b—and used an algorithm that accounts for edges that connect a node to the seed node within two degrees of separation—the system 102 may initially identify edges that directly connect the document node 302b to the seed node (i.e., the term node 306c). In this example, the document hosting system 102 would identify the document content edge 312c as the only edge directly connecting the document node 302b to the seed node. The document hosting system 102 would further identify that the document content edge 312c represents a specific relationship between the document node 302b and the seed node—that is, the contents of Document 432.3 contain the term "Positive Feedback Loops."

Based on identifying the relationship the document content edge 312c represents, the document hosting system 102 may determine a weight for the document content edge 312c using a function that multiplies various factors. For example, if the document hosting system 102 were to assign a time delay factor of 2.0 (based on the time since the relationship underlying each edge was established) and an edge type factor of 1.0 (based on the identified edge type for the document content edge 312c), the system 102 would calculate a weight of 5.0 for the document content edge 312c.

Continuing the preceding example—where the algorithm accounts for edges that connect a node to the seed node within two degrees of separation—the document hosting system 102 may further identify edges that indirectly connect the document node 302b to the seed node within two degrees of separation. Accordingly, the document hosting system 102 would identify that the document authorship edge 318, the edited document content edge 334, and the term authorship edge 328a indirectly connect the document node 302b to the seed node (through the user node 308a). The document hosting system 102 would further identify a relationship that each of the identified edges represent: the document authorship edge 318 represents that the user named Victoria Xin authored Document 432.3, the edited document content edge 334 represents that Victoria Xin edited the contents of Document 432.3, and the term authorship edge 328a represents that Victoria Xin authored at least one line that contains the term "Positive Feedback Loops."

Based on the relationships each of the identified edges represent, the document hosting system 102 may determine a weight for each of the document authorship edge 318, the edited document content edge 334, and the term authorship edge 328a using the same function as above. If the document hosting system 102 were to assign a time delay factor of 0.5 and an edge type factor of 1.0 to the document authorship edge 318, the system 102 would calculate a weight of 0.5 for the document authorship edge 318. Similarly, if the document hosting system 102 were to assign a time delay factor of 0.5 and an edge type factor of 2.0 to the edited document content edge 334—and a time delay factor of 1.0 and an edge type factor of 1.5 to the to the term authorship edge 328a—the system 102 would calculate a weight of 1.0 for the edited document content edge 334 and a weight of 1.5 for the term authorship edge 328a.

Assuming the document hosting system 102 had calculated a weight for each of the edges that directly or indirectly connect the seed node (i.e., the term node 306c) to the other nodes within two degrees of separation—including the document node 302a, the folder node 304a, the term node 306d, the user node 308a, and the user node 308b—the system 102 could generate a probability distribution based on each of the determined weights. In this example, the generated probability distribution would represent the probability that a user would navigate from the seed node to any one of the identified nodes 302a, 302b, 304a, 306d, 308a, 308b. To generate the probability distribution, the document hosting system 102 may run many iterations of a random walk from the seed node to the identified nodes. Each random walk may be based on the weights corresponding to the edges leading from a particular node to any connected nodes. For example, each particular random walk may be weighted such that it is more likely to travel along edges having higher weights than edges having lower weights. From within the probability distribution, the document hosting system 102 may identify a probability of 0.25 that a user would randomly navigate from the seed node to the document node 302b. Conversely, the document hosting system 102 may identify a probability of 0.20, 0.15, 0.15, 0.15, and 0.10 that a user would randomly navigate from the seed node to the user node 308a, document node 302a, folder node 304a, term node 306d, or user node 308b, respectively.

Continuing the example embodiment above, the probability that a user would randomly navigate from the seed node to the document node 302b is relative to the probability that a user would randomly navigate from the seed node to the user node 308a, document node 302a, folder node 304a, term node 306d, or user node 308b (i.e., the probabilities for all the nodes would sum to 1). Moreover, the probability value for each node could be used as the relevance score for each node (e.g., the relevance score for the document node 302b would equal 0.25 in this particular example). Based on the relevance scores, the document hosting system 102 may provide query results in order of highest scoring result to lowest scoring result by listing a result corresponding to the document node 302b before a result corresponding to each of the nodes 308a, 302a, 304a, 306d, and 308b within query results for the query of "Positive Feedback Loops."

The preceding paragraphs set forth one way in which the document hosting system 102 may calculate a score representing a relevance of a node to a query or user input. As noted above, the document hosting system 102 may use any algorithm suitable for an object graph to calculate a relevance score for a node within an object graph.

As also described above, in some embodiments, the document hosting system 102 receives a query from a user device. To facilitate receiving a query, the document hosting system 102, in some embodiments, provides a query field (or multiple query fields) to a user device for presentation to a user. In some embodiments, the query field comprises a field specific to a type of data object, such as a query field specifically for folders, documents, or user profiles. In such embodiments, the query field triggers a query for only one type of data object (e.g., not a query for both folders and documents). In other embodiments, the query field is specific to a data object within the contents or metadata of a folder, document, or user profiles, such as a query field specifically for terms within a document. In such embodiments, the query field triggers a query for only one data object within a folder, document, or user profile (i.e., not a query for both terms and images). In yet other embodiments, the document hosting system 102 provides a general query field that does not limit the query by type of data object.

Figure 4:
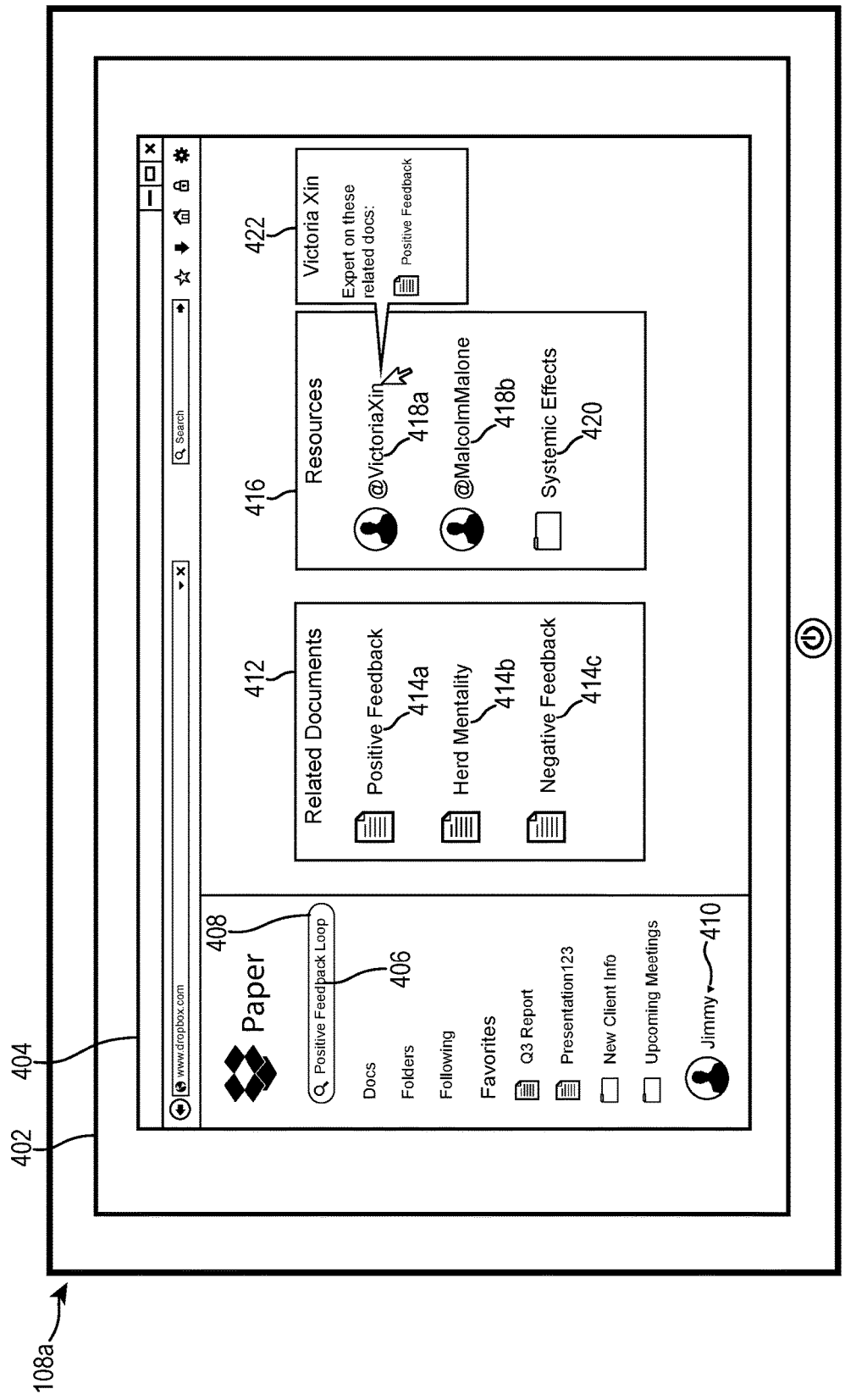
FIG. 4 illustrates a graphical user interface showing query results in accordance with one or more embodiments.

FIG. 4, for example, illustrates an embodiment of a graphical user interface 404 that the document hosting system 102 provides to the user device 108a (on a screen 402) to facilitate a query 406 within a general query field 408. As shown in FIG. 4, the general query field 408 does not limit queries by data object. Accordingly, when the document hosting system 102 analyzes information related to a corpus of documents and generates an object graph based on the query 406, the system 102 calculates relevance scores for nodes (within an object graph) that correspond to any type of data object.

Figure 5:
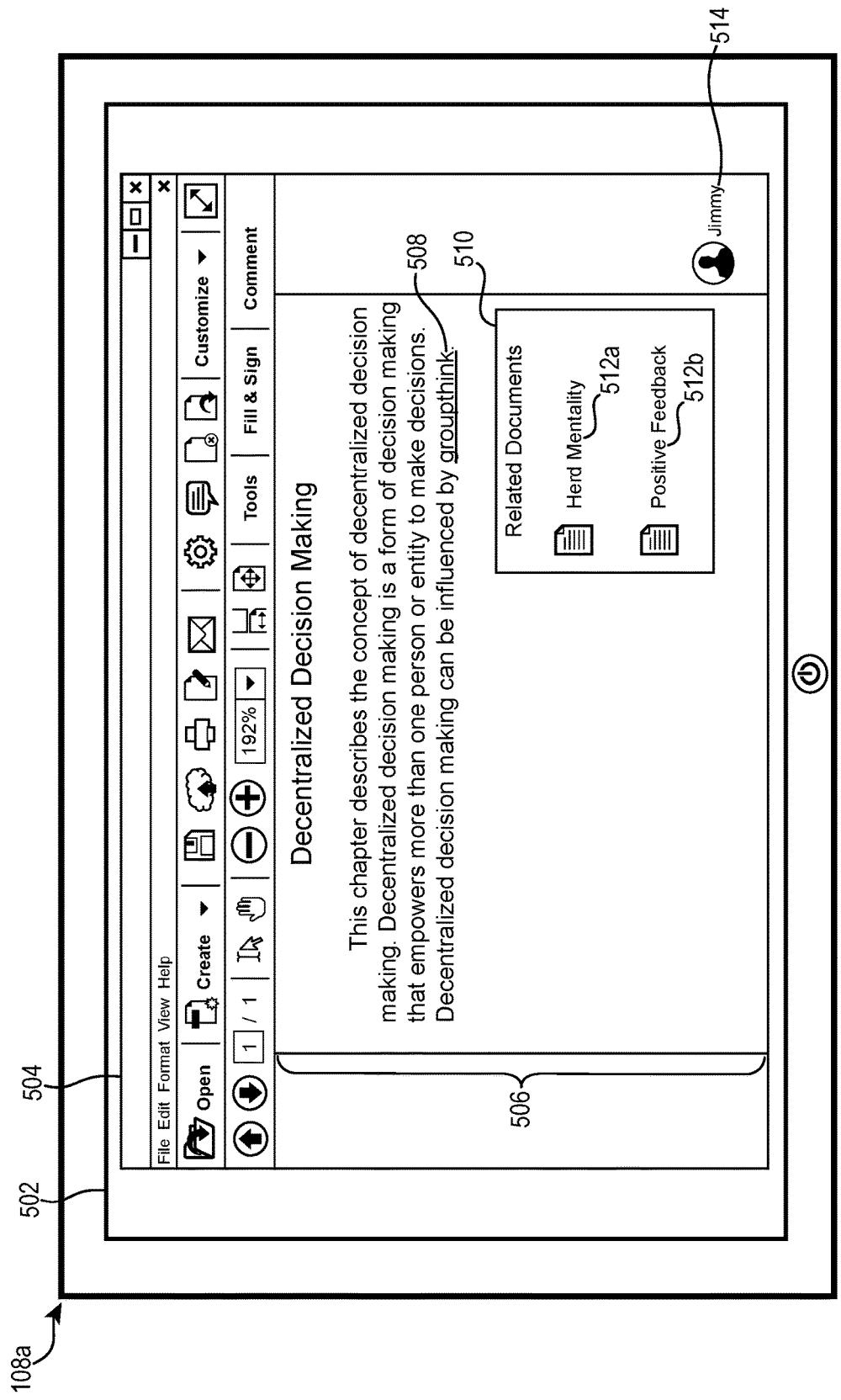
FIG. 5 illustrates an editing user interface showing recommendations in accordance with one or more embodiments.

In some embodiments of the document hosting system 102, however, the system 102 analyzes information related to a corpus of documents, generates an object graph, or calculates relevance scores based in part on an identity of the user entering a query or user input (that is, the current user). Among other things, FIGS. 4 and 5 illustrate embodiments of the document hosting system 102 that account for a current user. As shown in FIG. 4, for example, the graphical user interface 404 includes a current user profile indicator 410 that indicates the identity of the current user. In some embodiments—including those shown in FIGS. 4 and 5—the document hosting system 102 accounts for the identity of the current user by, for example, identifying folders, documents, or user profiles to which the current user has performed some action, including, but not limited to, authoring, creating, viewing, editing, emailing, posting, or deleting folders, documents, or user profiles. In certain embodiments, the document hosting system 102 accounts for the identity of the current user by assigning a weight of zero to a user node corresponding to the current user's profile.

As further described above, in some embodiments, the document hosting system 102 provides query results or recommendations to a user device. Query results or recommendations may comprise a link, thumbnail, summary, digital address, or image of a folder, document, or user profile. Additionally, in some embodiments, the document hosting system 102 provides query results or recommendations within query result categories or recommendation categories that describe how the results or recommendations relate to a query or user input.

As shown in FIG. 4, for example, the document hosting system 102 has provided query results-based on the query 406 for "Positive Feedback Loop"—in the graphical user interface 404 within both a related documents category 412 and a resources category 416. Within the related document category 412, the document hosting system 102 has provided a document result link 414a for a document entitled "Positive Feedback," a document result link 414b for a document entitled "Herd Mentality," and a document result link 414c for a document entitled "Negative Feedback." Within the resources category 416, the document hosting system 102 has provided a user profile link 418a for user "Victoria Xin," a user profile link 418b for user "Malcom Malone," and a folder link 420 for a folder entitled "Systemic Effects." In some embodiments, the document hosting system 102 can provide a single category of results to a user device (e.g., a list of results including documents, folders, or user profiles) or separate categories of results for documents, folders, or user profiles to a user device (e.g., a list of related documents including the four documents with the highest relevance scores). As with some of the embodiments described above, the document hosting system 102 has provided the query results shown in FIG. 4 based on calculated relevance scores that represent a relevance of a node to the query 406.

As part of any query results or recommendations, in some embodiments, the document hosting system 102 provides a summary of a query result or recommendation. As shown in FIG. 4, for example, the document hosting system 102 has provided a summary box 422, which briefly describes a relevance of the user profile represented by the user profile link 418a to the query 406. The document hosting system 102 provides the summary box 422 for presentation within the graphical user interface 404 when, for example, the current user interacts with the user profile link 418a by hovering a cursor over a portion of the graphical user interface 404 including the user profile link 418a, clicking on the portion of the graphical user interface 404 including the user profile link 418a, or touching the portion of the graphical user interface 404 including the user profile link 418a.

As noted above, in certain embodiments, the document hosting system 102 provides query results or recommendations that indicate a user (e.g., organization member) has expertise on a topic. The topic of expertise may correspond to a folder, document, term, project, team, organization, or any other topic. As shown in FIG. 4, for example, the summary box 422 describes the user Victoria Xin as an expert on one of the related documents linked by the related document link 414a. Although the query results depicted in FIG. 4 illustrate the summary box 422 as a response to the current user hovering a cursor over the user profile link 418a, other embodiments of the document hosting system 102 provide indicate that a user has expertise on a topic within an initial display of query results or recommendations.

Turning back now to FIG. 5, as described above, the document hosting system 102, in some embodiments, both receives user input from a user device and provides recommendations to the user device. FIG. 5 illustrates an embodiment of an editing user interface 504 that the document hosting system 102 provides to the user device 108a (on a screen 502) to facilitate user input. The editing user interface 504 includes a document text box 506 in which a current user may input text, among other things, as well as a current user indicator 514 that indicates the identity of the current user. When the current user inputs text using the user device 108a, including an inserted term 508 of "groupthink," the document hosting system 102 receives the user input, including the inserted term 508.

Similar to some of the embodiments described above-based on receiving the inserted term 508—the document hosting system 102 calculates a score for each node within an object graph connected to a seed node. In the embodiment shown in FIG. 5, the seed node represents the inserted term 508, and the calculated relevance scores represent a relevance of each node directly or indirectly connected to the seed node. Additionally, in the embodiment depicted in FIG. 5, the document hosting system 102 has calculated the weights (for each of the edges) as a function of one or more factors. Based on the calculated relevance scores, the document hosting system 102 has identified a couple of nodes with the highest relevance scores and provided a couple of corresponding recommendations associated with the couple nodes.

Specifically, as shown in FIG. 5, the document hosting system 102 has provided within a related document category 510 of the editing user interface 504—a related document link 512*a* and a related document link 512*b* to the user device 108*a*. The related document links 512*a* and 512*b* represent two examples of recommendations that the document hosting system 102 may provide to a user device. FIG. 5, however, illustrates merely one example of the ways in which the document hosting system 102 provides recommendations. Other embodiments of the document hosting system 102 provide recommendations consistent with the various embodiments described above.

Figure 6:
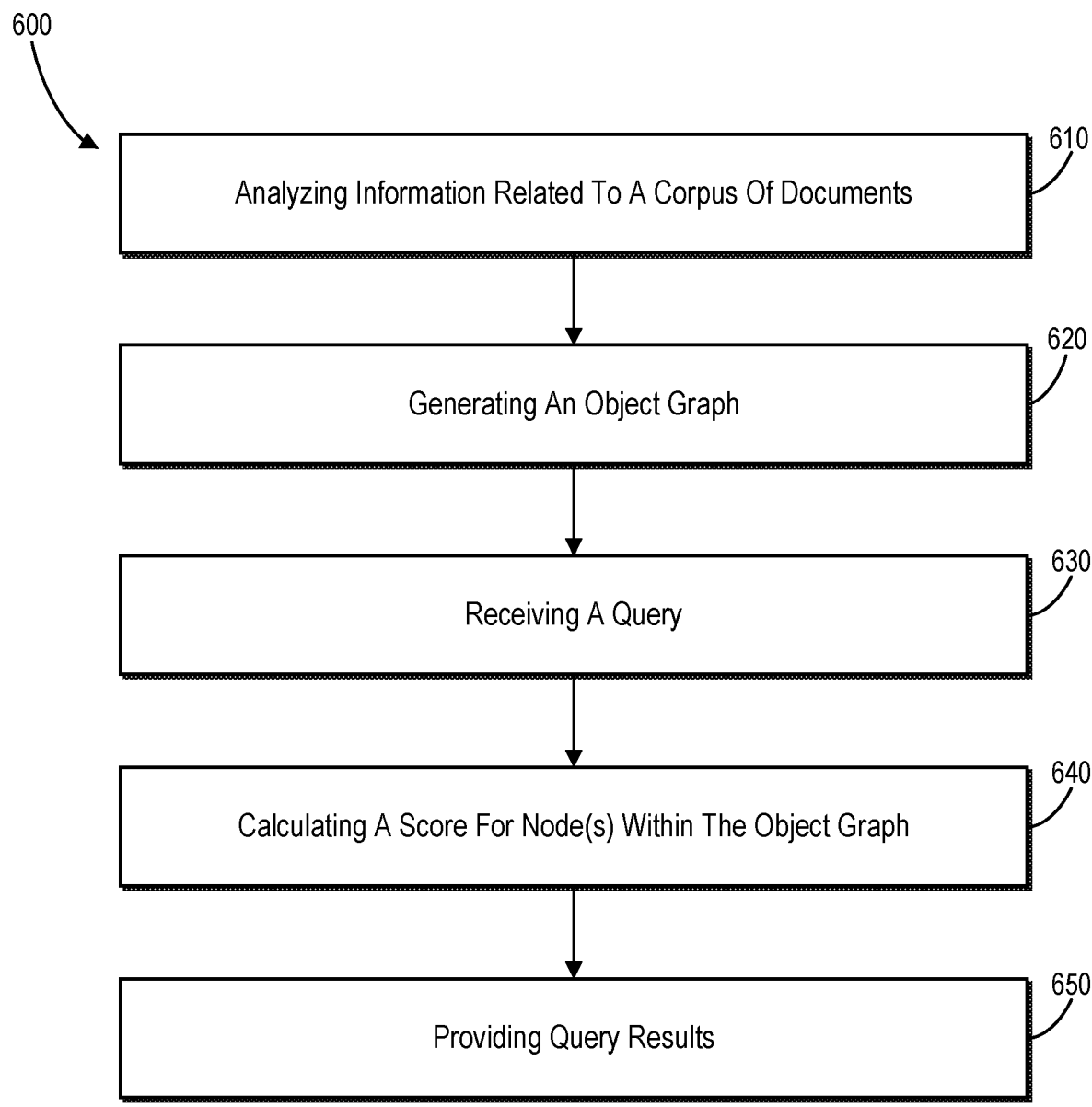
FIG. 6 illustrates a flowchart of a series of acts in a method of identifying relevant information for a user based on an object graph in accordance with one or more embodiments.

Turning now to FIG. 6, this figure illustrates a flowchart of a series of acts in a method 600 of identifying relevant information for a user based on an object graph for documents and other data objects hosted by the document hosting system 102. While FIG. 6 illustrates steps according to one embodiment, alternative embodiments may omit, add to, reorder, and/or modify any of the steps shown in FIG. 6. Further, the document hosting system 102, the user device 108*a*, or a combination of both, may perform one or more steps of the method 600.

As shown in FIG. 6, the method 600 includes an act 610 of analyzing information related to a corpus of documents. In particular, the act 610 can include analyzing a plurality of documents and associated folders, user profiles, and terms. For example, in one or more embodiments, analyzing the plurality of documents comprises identifying that a user has viewed a document of the plurality of documents. Additionally, in one or more embodiments, the plurality of documents is accessible to and controlled by an organization.

As illustrated in FIG. 6, the method 600 includes an act 620 of generating an object graph. In particular, the act 620 can include, based on the analysis, generating an object graph comprising a plurality of nodes connected by a plurality of edges, the plurality of nodes comprising document nodes, folder nodes, user nodes, and term nodes, and the plurality of edges representing relationships among the plurality of nodes. For example, in one or more embodiments, the one or more of the plurality of edges comprises user-to-user edges, user-to-folder edges, user-to-document edges, user-to-term edges, folder-to-folder edges, folder-to-document edges, folder-to-term edges, document-to-document edges, document-to-term edges, and term-to-term edges.

Additionally, in one or more embodiments, the user-to-user edges comprise at least one of a team member edge, project edge, superior-to-subordinate edge, or document collaboration edge; the user-to-folder edges comprise at least one of a folder creation edge, edited folder content edge, edited folder metadata edge, viewed folder content edge, viewed folder metadata edge, emailed folder edge, or posted folder edge; the user-to-document edges comprise at least one of a document authorship edge, document creation edge, edited document content edge, edited document metadata edge, viewed document content edge, viewed document metadata edge, emailed document edge, posted document edge, or permission edge; the user-to-term edges comprise at least one of a term authorship edge or term deleted edge; the folder-to-folder edges comprise at least one of a subfolder edge or shared parent folder edge; the folder-to-document edges comprise at least one of a document container edge or document removed edge; the folder-to-term edges comprise at least one of a folder title edge, metadata mention edge, or deleted metadata edge; the document-to-document edges comprise at least one of a shared parent folder edge, document version edge, or document hyperlink edge; the document-to-term edges comprise at least one of a document title edge, document content edge, document metadata edge, deleted title edge, deleted content edge, or deleted metadata edge; and the term-to-term edges comprise at least one of a term replacement edge, synonym edge, antonym edge, or proximity edge.

As also illustrated in FIG. 6, the method 600 includes an act 630 of receiving a query. In particular, the act 630 can include receiving a query from a user device. For example, in one or more embodiments, receiving the query comprises receiving a search term that has no corresponding node of the plurality of nodes.

As also illustrated in FIG. 6, the method 600 includes an act 640 of calculating a score for node(s) within the object graph. In particular, the act 640 can include utilizing the generated object graph to calculate a score for each of one or more of the plurality of nodes, each calculated score representing a relevance of each node to the query. For example, in one or more embodiments, calculating the score for each of the one or more of the plurality of nodes comprises identifying a seed node from the plurality of nodes within the object graph. Moreover, in one or more embodiments, calculating the score for each of the one or more of the plurality of nodes comprises: identifying one or more of the plurality of edges connecting the seed node to each of the one or more of the plurality of nodes; determining a weight for each of the one or more of the plurality of edges, wherein the weight accounts for one or more factors; and using the determined weights to calculate the score for each of the one or more of the plurality of nodes.

In some embodiments of the method 600, the one or more factors comprise a contribution factor that corresponds to a percentage of contribution by a user. Similarly, in some embodiments, the one or more factors comprise an edge type factor that corresponds to a type of edge associated with an edge of the one or more plurality of edges. Additionally, in some embodiments, the one or more factors comprise a time decay factor that corresponds to a time associated with an edge of the one or more plurality of edges. Moreover, in some embodiments, the one or more factors comprise a quantity factor that corresponds to a number of occurrences associated with an edge of the one or more plurality of edges. Further, in some embodiments, the one or more factors comprise a frequency factor that corresponds to a frequency of occurrences associated with an edge of the one or more plurality of edges. Finally, in some embodiments, the one or more factors comprise a usage factor that corresponds to a usage type associated with an edge of the one or more plurality of edges.

Relatedly, in some embodiments of the method 600, calculating the score for each of the one or more of the plurality of nodes comprises: generating a probability distribution based on the determined weights for each node; and identifying a relative probability for each node from within the probability distribution. Moreover, in some embodiments, determining the weight for each of the one or more of the plurality of edges comprises calculating the weight as a function of the one or more factors.

Additionally, in some embodiments in which receiving the query comprises receiving a search term that has no corresponding node of the plurality of nodes, calculating the score for each of the one or more of the plurality of nodes comprises: identifying a plurality of seed nodes from the plurality of nodes within the object graph, wherein the plurality of seed nodes represent terms related to the search term; identifying one or more of the plurality of edges connecting the plurality of seed nodes to the one or more of the plurality of nodes; and determining a weight for each of the one or more of the plurality of edges, wherein the weight accounts for one or more factors.

As also illustrated in FIG. 6, the method 600 includes an act 650 of providing query results. In particular, the act 650 can include, based on the calculated scores, providing query results to the user device. For example, in some embodiments in which analyzing the plurality of documents comprises identifying that a user has viewed a document of the plurality of documents, providing query results to the user device comprises excluding from the query results a result corresponding to the viewed document of the plurality of documents.

Figure 7:
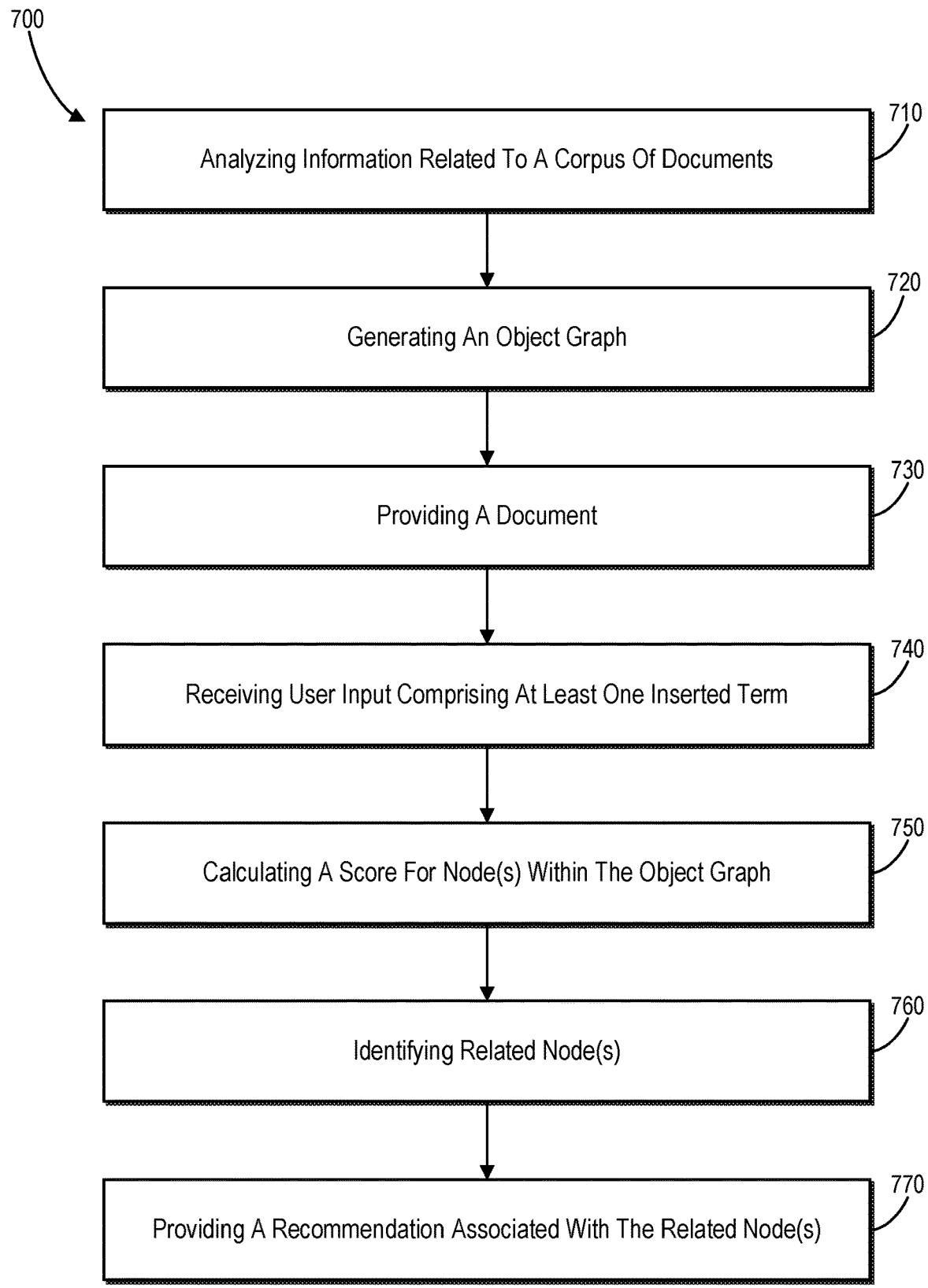
FIG. 7 illustrates a flowchart of a series of acts in a method of identifying relevant information for a user based on an object graph in accordance with one or more embodiments.

Turning now to FIG. 7, this figure illustrates a flowchart of a series of acts in a method 700 of identifying relevant information for a user based on an object graph for documents and other data objects hosted by the document hosting system 102. While FIG. 7 illustrates steps according to one embodiment, alternative embodiments may omit, add to, reorder, and/or modify any of the steps shown in FIG. 7. Further, the document hosting system 102, the user device 108a, or a combination of both, may perform one or more steps of the method 700.

As shown in FIG. 7, the method 700 includes an act 710 of analyzing information related to a corpus of documents. In particular, the act 710 can include analyzing a plurality of documents and associated folders, user profiles, and terms. For example, in one or more embodiments, analyzing the plurality of documents comprises identifying that a user has viewed a document of the plurality of documents. Additionally, in one or more embodiments, the plurality of documents is accessible to and controlled by an organization.

As also illustrated in FIG. 7, the method 700 includes an act 720 of generating an object graph. In particular, the act 720 can include, based on the analysis, generating an object graph comprising a plurality of nodes connected by a plurality of edges, the plurality of nodes comprising document nodes, folder nodes, user nodes, and term nodes, and the plurality of edges representing relationships among the plurality of nodes. For example, in one or more embodiments, the one or more of the plurality of edges comprises user-to-user edges, user-to-folder edges, user-to-document edges, user-to-term edges, folder-to-folder edges, folder-to-document edges, folder-to-term edges, document-to-document edges, document-to-term edges, and term-to-term edges.

Additionally, in one or more embodiments, the user-to-user edges comprise at least one of a team member edge, project edge, superior-to-subordinate edge, or document collaboration edge; the user-to-folder edges comprise at least one of a folder creation edge, edited folder content edge, edited folder metadata edge, viewed folder content edge, viewed folder metadata edge, emailed folder edge, or posted folder edge; the user-to-document edges comprise at least one of a document authorship edge, document creation edge, edited document content edge, edited document metadata edge, viewed document content edge, viewed document metadata edge, emailed document edge, posted document edge, or permission edge; the user-to-term edges comprise at least one of a term authorship edge or term deleted edge; the folder-to-folder edges comprise at least one of a subfolder edge or shared parent folder edge; the folder-to-document edges comprise at least one of a document container edge or document removed edge; the folder-to-term edges comprise at least one of a folder title edge, metadata mention edge, or deleted metadata edge; the document-to-document edges comprise at least one of a shared parent folder edge, document version edge, or document hyperlink edge; the document-to-term edges comprise at least one of a document title edge, document content edge, document metadata edge, deleted title edge, deleted content edge, or deleted metadata edge; and the term-to-term edges comprise at least one of a term replacement edge, synonym edge, antonym edge, or proximity edge.

As also illustrated in FIG. 7, the method 700 includes an act 730 of providing a document. In particular, the act 730 can include providing a document of the plurality of documents to a user device within an editing user interface.

As also illustrated in FIG. 7, the method 700 includes an act 740 of receiving user input comprising at least one inserted term. In particular, the act 740 can include receiving user input from the user device within the user editing interface, the user input comprising at least one inserted term.

As also illustrated in FIG. 7, the method 700 includes an act 750 of calculating a score for node(s) within the object graph. In particular, the act 750 can include, based on receiving the input, utilizing the generated object graph to calculate a score for each of one or more of the plurality of nodes, each calculated score representing a relevance of each node to the at least one inserted term.

For example, in one or more embodiments, calculating the score for each of the one or more of the plurality of nodes comprises: identifying a seed node from the plurality of nodes within the object graph, wherein the seed node comprises a term node of the plurality of nodes that represents the at least one inserted term; identifying one or more of the plurality of edges connecting the seed node to each of the one or more of the plurality of nodes; and determining a weight for each of the one or more of the plurality of edges, wherein the weight accounts for one or more factors.

Additionally, in one or more embodiments, the method 700 also includes determining that the at least one inserted term comprises a common term and an additional term, wherein the calculated score represents a relevance of each node to the additional term and excludes a relevance of each node to the common term.

As also illustrated in FIG. 7, the method 700 includes an act 760 of identifying related node(s). In particular, the act 760 can include, based on the calculated scores, identifying one or more related nodes.

As also illustrated in FIG. 7, the method 700 includes an act 770 of providing a recommendation associated with the related node(s). In particular, the act 770 can include providing, to the user device within the editing user interface, a recommendation associated with the one or more related nodes. For example, in one or more embodiments, the provided recommendation comprises a link within the editing user interface to a document of the plurality of documents with the highest calculated score.

Figure 8:
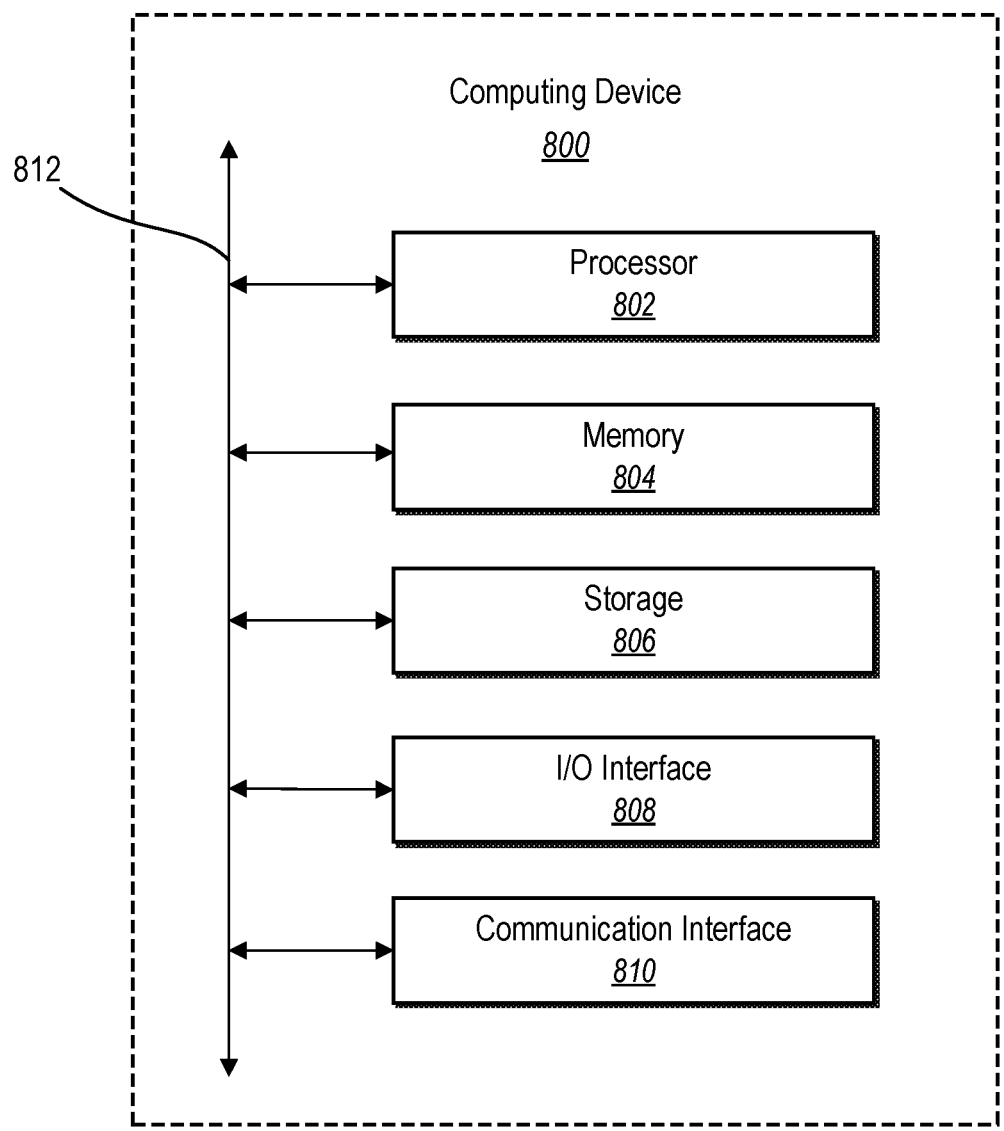
FIG. 8 illustrates a block diagram of a computing device in accordance with one or more embodiments.

FIG. 8 illustrates a block diagram of exemplary computing device 800 that may be configured to perform one or more of the processes described above. One will appreciate that server(s) 104 and/or user devices 108a-108n may comprise one or more computing devices such as computing device 800. As shown by FIG. 8, computing device 800 can comprise processor 802, memory 804, storage device 806, I/O interface 808, and communication interface 810, which may be communicatively coupled by way of communication infrastructure 812. While an exemplary computing device 800 is shown in FIG. 8, the components illustrated in FIG. 8 are not intended to be limiting. Additional or alternative components may be used in other embodiments. Furthermore, in certain embodiments, computing device 800 can include fewer components than those shown in FIG. 8. Components of computing device 800 shown in FIG. 8 will now be described in additional detail.

In particular embodiments, processor 802 includes hardware for executing instructions, such as those making up a computer program. As an example and not by way of limitation, to execute instructions, processor 802 may retrieve (or fetch) the instructions from an internal register, an internal cache, memory 804, or storage device 806 and decode and execute them. In particular embodiments, processor 802 may include one or more internal caches for data, instructions, or addresses. As an example and not by way of limitation, processor 802 may include one or more instruction caches, one or more data caches, and one or more translation lookaside buffers (TLBs). Instructions in the instruction caches may be copies of instructions in memory 804 or storage device 806.

Memory 804 may be used for storing data, metadata, and programs for execution by the processor(s). Memory 804 may include one or more of volatile and non-volatile memories, such as Random Access Memory ("RAM"), Read Only Memory ("ROM"), a solid state disk ("SSD"), Flash, Phase Change Memory ("PCM"), or other types of data storage. Memory 804 may be internal or distributed memory.

Storage device 806 includes storage for storing data or instructions. As an example and not by way of limitation, storage device 806 can comprise a non-transitory storage medium described above. Storage device 806 may include a hard disk drive (HDD), a floppy disk drive, flash memory, an optical disc, a magneto-optical disc, magnetic tape, or a Universal Serial Bus (USB) drive or a combination of two or more of these. Storage device 806 may include removable or non-removable (or fixed) media, where appropriate. Storage device 806 may be internal or external to computing device 800. In particular embodiments, storage device 806 is non-volatile, solid-state memory. In other embodiments, Storage device 806 includes read-only memory (ROM). Where appropriate, this ROM may be mask programmed ROM, programmable ROM (PROM), erasable PROM (EPROM), electrically erasable PROM (EEPROM), electrically alterable ROM (EAROM), or flash memory or a combination of two or more of these.

I/O interface 808 allows a user to provide input to, receive output from, and otherwise transfer data to and receive data from computing device 800. I/O interface 808 may include a mouse, a keypad or a keyboard, a touch screen, a camera, an optical scanner, network interface, modem, other known I/O devices or a combination of such I/O interfaces. I/O interface 808 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interface 808 is configured to provide graphical data to a display for presentation to a user. The graphical data may be representative of one or more graphical user interfaces and/or any other graphical content as may serve a particular implementation.

Communication interface 810 can include hardware, software, or both. In any event, communication interface 810 can provide one or more interfaces for communication (such as, for example, packet-based communication) between computing device 800 and one or more other computing devices or networks. As an example and not by way of limitation, communication interface 810 may include a network interface controller (NIC) or network adapter for communicating with an Ethernet or other wire-based network or a wireless NIC (WNIC) or wireless adapter for communicating with a wireless network, such as a WI-FI.

Additionally or alternatively, communication interface 810 may facilitate communications with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, communication interface 810 may facilitate communications with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination thereof.

Additionally, communication interface 810 may facilitate communications various communication protocols. Examples of communication protocols that may be used include, but are not limited to, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Time Division Multiple Access ("TDMA") technologies, Short Message Service ("SMS"), Multimedia Message Service ("MMS"), radio frequency ("RF") signaling technologies, Long Term Evolution ("LTE") technologies, wireless communication technologies, in-band and out-of-band signaling technologies, and other suitable communications networks and technologies.

Communication infrastructure 812 may include hardware, software, or both that couples components of computing device 800 to each other. As an example and not by way of limitation, communication infrastructure 812 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination thereof.

Figure 9:
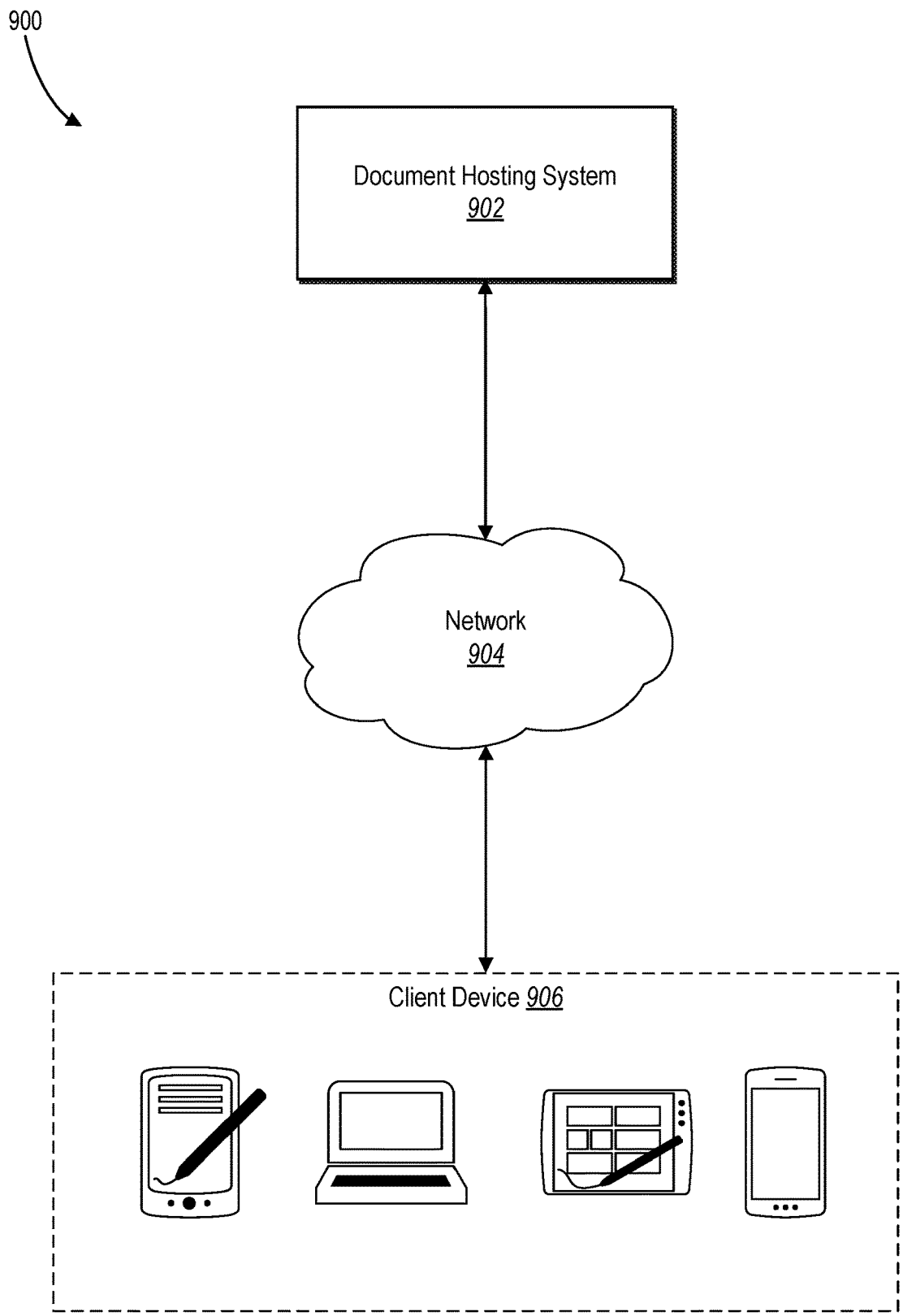
FIG. 9 illustrates a networking environment of a document hosting system in accordance with one or more embodiments.

FIG. 9 is a schematic diagram illustrating an environment within which one or more embodiments of the document hosting system 102 can be implemented. Document hosting system 902 may generate, store, manage, receive, and send digital content (such as digital videos). For example, document hosting system 902 may send and receive digital content to and from client devices 906 by way of network 904. In particular, document hosting system 902 can store and manage a collection of digital content. Document hosting system 902 can manage the sharing of digital content between computing devices associated with a plurality of users. For instance, document hosting system 902 can facilitate a user sharing a digital content with another user of document hosting system 902.

In particular, document hosting system 902 can manage synchronizing digital content across multiple client devices 906 associated with one or more users. For example, a user may edit digital content using client device 906. The document hosting system 902 can cause client device 906 to send the edited digital content to document hosting system 902. Document hosting system 902 then synchronizes the edited digital content on one or more additional computing devices.

In addition to synchronizing digital content across multiple devices, one or more embodiments of document hosting system 902 can provide an efficient storage option for users that have large collections of digital content. For example, document hosting system 902 can store a collection of digital content on document hosting system 902, while the client device 906 only stores reduced-sized versions of the digital content. A user can navigate and browse the reduced-sized versions (e.g., a thumbnail of a digital image) of the digital content on client device 906. In particular, one way in which a user can experience digital content is to browse the reduced-sized versions of the digital content on client device 906.

Another way in which a user can experience digital content is to select a reduced-size version of digital content to request the full- or high-resolution version of digital content from document hosting system 902. In particular, upon a user selecting a reduced-sized version of digital content, client device 906 sends a request to document hosting system 902 requesting the digital content associated with the reduced-sized version of the digital content. Document hosting system 902 can respond to the request by sending the digital content to client device 906. Client device 906, upon receiving the digital content, can then present the digital content to the user. In this way, a user can have access to large collections of digital content while minimizing the amount of resources used on client device 906.

Client device 906 may be a desktop computer, a laptop computer, a tablet computer, a personal digital assistant (PDA), an in- or out-of-car navigation system, a handheld device, a smart phone or other cellular or mobile phone, or a mobile gaming device, other mobile device, or other suitable computing devices. Client device 906 may execute one or more client applications, such as a web browser (e.g., Microsoft Windows Internet Explorer, Mozilla Firefox, Apple Safari, Google Chrome, Opera, etc.) or a native or special-purpose client application (e.g., Dropbox Paper for iPhone or iPad, Dropbox Paper for Android, etc.), to access and view content over network 904.

Network 904 may represent a network or collection of networks (such as the Internet, a corporate intranet, a virtual private network (VPN), a local area network (LAN), a wireless local area network (WLAN), a cellular network, a wide area network (WAN), a metropolitan area network (MAN), or a combination of two or more such networks) over which client devices 906 may access document hosting system 902.

In the foregoing specification, the present disclosure has been described with reference to specific exemplary embodiments thereof. Various embodiments and aspects of the present disclosure(s) are described with reference to details discussed herein, and the accompanying drawings illustrate the various embodiments. The description above and drawings are illustrative of the disclosure and are not to be construed as limiting the disclosure. Numerous specific details are described to provide a thorough understanding of various embodiments of the present disclosure.

The present disclosure may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the present application is, therefore, indicated by the appended claims rather than by the foregoing description. All changes that come within the meaning and range of equivalency of the claims are to be embraced within their scope.

What is claimed is:

1. A computer-implemented method comprising:
   detecting, in real time, an inserted term in an editing user interface of a document editing application;
   identifying, using the inserted term detected in real time in the editing user interface, a seed node within an object graph comprising a plurality of nodes connected by a plurality of edges representing relationships between the plurality of nodes, wherein the plurality of nodes comprises document nodes, folder nodes, and user profile nodes;
   utilizing, by at least one processor, the object graph to calculate a score for each of one or more of the plurality of nodes, each calculated score representing a relevance of each node to the seed node;
   based on the calculated scores, providing in real time, within a graphical user interface of the document editing application, a plurality of recommendations associated with one or more nodes from the plurality of nodes, wherein the plurality of recommendations comprises a user profile link;
   receiving, in real time, an indication of a user interaction with the user profile link in the graphical user interface of the document editing application; and
   in response to the indication of the user interaction with the user profile link, providing in real time, for display via the graphical user interface of the document editing application, an additional recommendation comprising a document link related to the user profile link or a folder link related to the user profile link.

2. The computer-implemented method of claim 1, further comprising, and in response to receiving an indication of a user selection of the document link, providing a copy of a first document corresponding to the document link for display in the graphical user interface.

3. The computer-implemented method of claim 2, further comprising:
   utilizing the object graph to identify a second document that is related to the first document based on the indication of the user selection of the document link; and
   providing a link to the second document within the graphical user interface while the copy of the first document is displayed.

4. The computer-implemented method of claim 1, further comprising providing, for display via the graphical user interface of the document editing application, a summary graphic comprising a relevance summary of the document link or the folder link to the user profile link.

5. The computer-implemented method of claim 1, wherein the plurality of edges comprises at least one of user-to-user edges, user-to-folder edges, user-to-document edges, folder-to-folder edges, folder-to-document edges, or document-to-document edges.

6. The computer-implemented method of claim 1, wherein calculating the score for each of the one or more of the plurality of nodes comprises:

generating a probability distribution based on weights corresponding to each node; and identifying a relative probability for each node from within the probability distribution.

7. The computer-implemented method of claim 1, wherein providing the additional recommendation comprising the document link or the folder link comprises providing an indication of a relationship between a user profile of the user profile link and either a document of the document link or a folder of the folder link.

8. A system comprising:
at least one processor; and
at least one non-transitory computer readable storage medium storing instructions that, when executed by the at least one processor, cause the system to:
detect, in real time, an inserted term in an editing user interface of a document editing application;
identify, using the inserted term detected in real time in the editing user interface, a seed node within an object graph comprising a plurality of nodes connected by a plurality of edges representing relationships between the plurality of nodes, wherein the plurality of nodes comprises document nodes, folder nodes, and user profile nodes;
utilize, by at least one processor, the object graph to calculate a score for each of one or more of the plurality of nodes, each calculated score representing a relevance of each node to the seed node;
based on the calculated scores, provide in real time, within a graphical user interface of the document editing application, a plurality of recommendations associated with one or more nodes from the plurality of nodes, wherein the plurality of recommendations comprises a user profile link;
receive, in real time, an indication of a user interaction with the user profile link in the graphical user interface of the document editing application; and
in response to the indication of the user interaction with the user profile link, indicate in real time, within the graphical user interface of the document editing application, an additional recommendation comprising a document link related to the user profile link.

9. The system of claim 8, further comprising instructions, that when executed by the at least one processor, cause the system to detect the inserted term comprising a search term identified from a user input within the document editing application.

10. The system of claim 8, further comprising instructions, that when executed by the at least one processor, cause the system to provide a copy of a first document corresponding to the document link for display in the graphical user interface in response to receiving an indication of a user selection of the document link.

11. The system of claim 10, further comprising instructions, that when executed by the at least one processor, cause the system to:
utilize the object graph to identify a second document that is related to the first document; and
provide a link to the second document within the graphical user interface while the copy of the first document is displayed.

12. The system of claim 8, further comprising instructions, that when executed by the at least one processor, cause the system to calculate the score for each of the one or more of the plurality of nodes by:
generating a probability distribution based on weights corresponding to each node; and identifying a relative probability for each node from within the probability distribution.

13. The system of claim 8, wherein indicating the additional recommendation comprising the document link comprises indicating a relationship between a user profile of the user profile link and a document of the document link.

14. The system of claim 8, further comprising instructions, that when executed by the at least one processor, cause the system to provide, for display via the graphical user interface of the document editing application, a summary graphic comprising a relevance summary of the document link to the user profile link.

15. A non-transitory computer readable medium storing instructions that, when executed by at least one processor, cause a computer device to:
analyze a plurality of documents, folders, and user profiles stored within a document hosting system;
based on the analysis, generate an object graph comprising a plurality of nodes connected by a plurality of edges representing relationships among the plurality of nodes, wherein the plurality of nodes comprises at least one of document nodes, folder nodes, or user profile nodes;
identify, using an inserted term detected in an editing user interface of a document editing application, a seed node within the object graph;
utilize, by at least one processor, the object graph to calculate a score for each of one or more of the plurality of nodes, each calculated score representing a relevance of each node to the seed node;
based on the calculated scores, provide in real time, within a graphical user interface of the document editing application, a plurality of recommendations associated with one or more nodes from the plurality of nodes, wherein the plurality of recommendations comprises a user profile link;
receive, in real time, an indication of a user interaction with the user profile link in the graphical user interface of the document editing application; and
in response to the indication of the user interaction with the user profile link, indicate in real time, within the graphical user interface of the document editing application, an additional recommendation comprising a document link related to the user profile link.

16. The non-transitory computer readable medium of claim 15, further comprising instructions that, when executed by the at least one processor, cause the computer device to provide a copy of a first document corresponding to the document link for display in the graphical user interface in response to receiving an indication of a user selection of the document link.

17. The non-transitory computer readable medium of claim 16, further comprising instructions that, when executed by the at least one processor, cause the computer device to:
utilize the object graph to identify a second document that is related to the first document; and
provide a link to the second document within the graphical user interface while the copy of the first document is displayed.

18. The non-transitory computer readable medium of claim 15, wherein indicating the additional recommendation comprising the document link comprises indicating a relationship between a user profile associated with the user profile link and a document associated with the document link.

19. The non-transitory computer readable medium of claim 15, further comprising instructions that, when executed by the at least one processor, cause the computer device to provide, for display via the graphical user interface of the document editing application, a summary graphic comprising a relevance summary of the document link to the user profile link.

20. The non-transitory computer readable medium of claim 15, wherein the plurality of edges comprises at least one of user-to-user edges, user-to-folder edges, user-to-document edges, folder-to-folder edges, folder-to-document edges, or document-to-document edges.

* * * * *